United States Patent
Bourque et al.

(10) Patent No.: US 12,552,483 B2
(45) Date of Patent: Feb. 17, 2026

(54) ELECTRIC VEHICLE WITH A COOLING ARRANGEMENT

(71) Applicant: BOMBARDIER RECREATIONAL PRODUCTS INC., Valcourt (CA)

(72) Inventors: Yannick Bourque, St-Denis-de-Brompton (CA); Thomas Driant, Saint-Francois-Xavier-de-Brompton (CA); Jean Guillemette, Valcourt (CA); Jonathan Fortier, Lawrenceville (CA); Alexandre Vachon, Sherbrooke (CA); Alexandre Leclair, Orford (CA); Emile Maltais-Larouche, Valcourt (CA); Jerome Demers, Sunnyvale, CA (US); Bruno Cyr, Shefford (CA); Pierre-Luc Robillard, Sherbrooke (CA); Christopher Gauthier, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 37 days.

(21) Appl. No.: 18/705,842

(22) PCT Filed: Oct. 31, 2022

(86) PCT No.: PCT/IB2022/060500
§ 371 (c)(1),
(2) Date: Apr. 29, 2024

(87) PCT Pub. No.: WO2023/073673
PCT Pub. Date: May 4, 2023

(65) Prior Publication Data
US 2025/0286172 A1 Sep. 11, 2025

Related U.S. Application Data

(60) Provisional application No. 63/273,468, filed on Oct. 29, 2021, provisional application No. 63/273,435, filed on Oct. 29, 2021.

(51) Int. Cl.
*B62J 43/16* (2020.01)
*B62M 7/04* (2006.01)
*B62M 27/02* (2006.01)

(52) U.S. Cl.
CPC ............. *B62J 43/16* (2020.02); *B62M 7/04* (2013.01); *B62M 27/02* (2013.01)

(58) Field of Classification Search
CPC .................. B62M 7/04; B62J 43/16
See application file for complete search history.

(56) References Cited

U.S. PATENT DOCUMENTS 8,672,077 B2   3/2014   Sand et al.
8,897,959 B1   11/2014  Sweney et al.
(Continued)

FOREIGN PATENT DOCUMENTS

CN   112977694 A       6/2021
CN   118323308 A   *   7/2024   ........ H01M 10/6567
(Continued)

*Primary Examiner* — Kevin Hurley
(74) *Attorney, Agent, or Firm* — BCF LLP

(57) ABSTRACT

An electric vehicle including a frame; at least one ground-engaging member operatively connected to the frame; an electric motor operatively connected to the at least one ground-engaging member; an electric powerpack supported by the frame, the powerpack including: a battery pack defining a battery cooling channel; and a plurality of battery cells housed in the battery housing; a charger defining a charger cooling channel; an inverter including an inverter cooling channel, the battery cooling channel, the charger cooling channel, and the inverter cooling channel being fluidly connected together by rigid fluid connections; radiators fluidly connected to the battery cooling channel; a cooling circuit being formed at least in part by the battery cooling channel, the charger cooling channel, the inverter cooling channel, and the at least one radiator; and a pump (Continued)

fluidly connected to the cooling circuit for pumping liquid coolant through the cooling circuit.

20 Claims, 19 Drawing Sheets

(56) References Cited

U.S. PATENT DOCUMENTS

| | | |
|---|---|---|
| 9,193,411 B2 | 11/2015 | Sand et al. |
| 9,403,574 B2 | 8/2016 | Sand et al. |
| 9,415,673 B2 | 8/2016 | Blain et al. |
| 9,446,659 B1 | 9/2016 | Blain et al. |
| 9,941,556 B2 | 4/2018 | Testoni |
| 10,008,704 B2 | 6/2018 | Sweney et al. |
| 10,559,797 B2 | 2/2020 | Sweney et al. |
| 10,787,219 B2 | 9/2020 | Oba |
| 2013/0244069 A1 | 9/2013 | Horii et al. |
| 2013/0270038 A1 | 10/2013 | Nitta |
| 2013/0270938 A1 | 10/2013 | Matsuda |
| 2014/0234668 A1 | 8/2014 | Sweney et al. |
| 2014/0234683 A1 | 8/2014 | Sweney |
| 2014/0234686 A1 | 8/2014 | Sweney et al. |
| 2015/0008061 A1 | 1/2015 | Matsuda |
| 2015/0122563 A1 | 5/2015 | Kondo et al. |
| 2015/0314830 A1 | 11/2015 | Inoue |
| 2016/0068224 A1 | 3/2016 | Rasmussen |
| 2016/0240900 A1 | 8/2016 | Testoni |
| 2016/0268655 A1 | 9/2016 | Takamatsu et al. |
| 2017/0129570 A1 | 5/2017 | Mangum et al. |
| 2017/0288285 A1 | 10/2017 | Buckhout et al. |
| 2020/0031420 A1 | 1/2020 | Aunkst et al. |
| 2020/0130498 A1 | 4/2020 | Matsushima et al. |
| 2025/0276756 A1 * | 9/2025 | Bourque ............... B62J 43/20 |

FOREIGN PATENT DOCUMENTS

| | | | | |
|---|---|---|---|---|
| EP | 4438361 A1 * | 10/2024 | ......... | H05K 7/20927 |
| WO | 2019096680 A1 | 5/2019 | | |
| WO | 2019/186749 A1 | 12/2020 | | |

* cited by examiner

ELECTRIC VEHICLE WITH A COOLING ARRANGEMENT

CROSS-REFERENCE

The present application is a National Stage of International Application No. PCT/IB2022/060500, filed on Oct. 31, 2022, which claims priority from U.S. Provisional Patent Application No. 63/273,435, entitled "Electric Vehicle with a Cooling Arrangement," filed Oct. 29, 2021, and to U.S. Provisional Patent Application No. 63/273,468, entitled "Electric Vehicle with an Electric Powerpack Arrangement," filed Oct. 29, 2021, the entirety of each of which is incorporated by reference herein.

FIELD OF TECHNOLOGY

The present technology relates to electric vehicles having cooling arrangements, specifically straddle-seat electric vehicles.

BACKGROUND

Straddle seat vehicles, including motorcycles, all-terrain vehicles, and snowmobiles, are popular transport and recreational vehicles. As the move toward electrification of vehicles progresses, interest in electric versions of straddle seat vehicles increases. Electric vehicles generally include components that are required to be maintained within a specified temperature range, for instance battery packs, inverters, and motors. In some vehicles, cooling is provided through air-flow based cooling arrangements.

To better address cooling of each component, some solutions include circulating a liquid coolant around a circuit in thermal communication with the heat-generating components and one or more heat exchangers. In order to circulate the liquid coolant through these heat generating components, as well as to and from the heat exchanger(s), hoses are often employed.

Applied to straddle seat electric vehicles, however, hoses manifest several disadvantages. For example, hoses generally have a minimum radius of curvature which limits how much the hose can be bent. In the compact powerpack arrangements necessary for straddle seat vehicles, curvature limitations can severely restrict the possible layout design of the different powerpack components. Inclusion of hoses extending between different components further occupies the limited space. It is further noted that each hose and hose connection adds complication in terms of fabrication and maintenance. Each hose and hose connection could be a point of failure (in the form of material failure like cracking or leaks) and requires installation for each liquid connection via clamp, collar or other mechanical means.

There is therefore a desire for cooling arrangements for electric straddle seat vehicles addressing at least some of the above described disadvantages.

SUMMARY

It is an object of the present technology to ameliorate at least some of the inconveniences present in the prior art.

According to one aspect of the present technology, there is provided an electric vehicle, specifically an electric motorcycle and an electric snowmobile, with an electric powerpack and a liquid cooling circuit. Portions of the cooling circuit within the powerpack, specifically cooling channels of the battery pack, the charger, and the inverter, are fluidly connected together through rigid connections, including by portions of the battery pack housing, the charger housing, and the inverter housing. In this way, no hoses or tubing is required within the powerpack, thereby reducing the number of parts to be assembled and reducing the number of points of possible leaks within the powerpack. A coolant reservoir is further rigidly fluidly connected to the cooling channels of the battery pack, the charger, and the inverter.

According to one aspect of the present technology, there is provided an electric vehicle including a frame; at least one ground-engaging member operatively connected to the frame; an electric motor operatively connected to the at least one ground-engaging member; an electric powerpack supported by the frame, the powerpack including: a battery pack including: a battery housing defining a battery cooling channel; and a plurality of battery cells housed in the battery housing; a charger electrically connected to the plurality of battery cells, the charger including: a charger housing defining a charger cooling channel; an inverter electrically connected to the plurality of battery cells, the inverter including: an inverter housing defining an inverter cooling channel, the battery cooling channel, the charger cooling channel, and the inverter cooling channel being fluidly connected together by rigid fluid connections; at least one radiator fluidly connected to the battery cooling channel; a cooling circuit being formed at least in part by the battery cooling channel, the charger cooling channel, the inverter cooling channel, and the at least one radiator; and a pump fluidly connected to the cooling circuit for pumping liquid coolant through the cooling circuit.

In some embodiments, the vehicle further includes a motor cooling channel for cooling the electric motor fluidly connected to the battery cooling channel and forming a portion of the cooling circuit.

In some embodiments, the vehicle further includes a swing arm pivotally connected to the frame, the swing arm including a swing arm housing; and the electric motor includes a motor housing; the motor housing includes a channeled outer surface in thermal contact with at least some internal components of the electric motor; the swing arm housing defines a motor cavity; the electric motor being disposed in the motor cavity; and the motor cooling channel is formed between the channeled outer surface of the motor housing and an internal surface of the motor cavity.

In some embodiments, the vehicle further includes at least one flexible tube fluidly connecting the motor cooling channel to the pump.

In some embodiments, a channel formed by the channeled outer surface forms a spiral winding around an exterior of the electric motor.

In some embodiments, the inverter housing is fastened to the battery housing; and at least one of an inlet and an outlet of the inverter cooling channel is connected to at least one of an inlet and an outlet of the battery cooling channel.

In some embodiments, the battery pack includes a first electric connector electrically connected to the plurality of battery cells and disposed on an exterior of the battery housing; the inverter includes a second electric connector disposed on an exterior of the invertor housing; the first electric connector and the second electric connector are selectively connected together; and when the vehicle is in operation, the inverter receives electric power from the plurality of battery cells via the first electric connector and the second electric connector.

In some embodiments, the second electric connector and the at least one of the inlet and the outlet of the inverter cooling channel are disposed on a same side of the inverter.

In some embodiments, the charger and the inverter are mounted to the battery housing.

In some embodiments, the vehicle further includes a coolant reservoir connected to the powerpack.

In some embodiments, the vehicle further includes at least one of the rigid fluid connections connecting the battery cooling channel, the charger cooling channel, and the inverter cooling channel together is formed by one of the charger housing, the battery housing, and the inverter housing.

In some embodiments, connections between the battery cooling channel, the charger cooling channel, and the inverter cooling channel are internal to the electric powerpack.

In some embodiments, the charger cooling channel extends along a side of the charger facing an interior of the powerpack; and the inverter cooling channel extends along a side of the inverter facing the interior of the powerpack.

In some embodiments, the battery cooling channel extends through a center portion of the battery pack in the interior of the powerpack.

In some embodiments, the at least one radiator includes: a left radiator disposed on a left side of the vehicle; and a right radiator disposed on a right side of the vehicle.

In some embodiments, the vehicle further includes a plurality of flexible tubing components fluidly connecting the left radiator and the right radiator to the at least one battery cooling channel and forming a portion of the cooling circuit.

In some embodiments, at least one of the left radiator and the right radiator includes a fan connected to a radiator housing thereof.

In some embodiments, the vehicle further includes a coolant reservoir fluidly connected to the cooling circuit.

In some embodiments, the charger housing includes at least one of an inlet and an outlet configured to be sealingly fit into at least one of an outlet and an inlet of the coolant reservoir.

In some embodiments, the coolant reservoir is disposed at least partially forward of the electric powerpack; and the pump is disposed at least partially rearward of the electric powerpack.

In some embodiments, the vehicle further includes a motor cooling channel for cooling the electric motor fluidly connected to the battery cooling channel, and a coolant reservoir connected to the powerpack; and the at least one radiator includes a pair of radiators, and the cooling circuit is further formed by at least the pair of radiators, the motor cooling channel, and the coolant reservoir.

In some embodiments, the vehicle further includes a straddle seat; and the at least one ground-engaging member includes: at least one front ground-engaging member disposed at least in part forward of the electric powerpack, and at least one rear ground-engaging member disposed at least in part rearward of the electric powerpack.

In some embodiments, the at least one ground-engaging member includes: a front wheel disposed at least in part forward of the electric powerpack, and a rear wheel disposed at least in part rearward of the electric powerpack; and the vehicle is an electric motorcycle.

In some embodiments, the vehicle is an electric snowmobile; and the at least one ground-engaging member includes two skis.

According to another aspect of the present technology, there is provided an electric vehicle having: a frame, the frame having a pair of frame members; a front ground-engaging member operatively connected to the frame; a swing arm pivotally connected to the pair of frame members about a swing arm pivot axis, the swing arm pivot axis extending through the pair of frame members; a rear ground-engaging member operatively connected to the swing arm; an electric motor mounted to the swing arm and operatively connected to the rear ground-engaging member; a motor cooling channel in thermal communication with the electric motor for cooling the electric motor; a battery pack supported by the frame; a battery cooling channel in thermal communication with the battery pack for cooling the battery pack; and at least one hose fluidly connected between the battery cooling channel and the motor cooling channel, the at least one hose extending in a space defined laterally between the frame members and longitudinally between the battery pack and the motor.

In some embodiments, the swing arm pivot axis extends through the space defined laterally between the frame members and longitudinally between the battery pack and the motor.

In some embodiments, with the vehicle at rest: a front end of the at least one hose is forward of the swing arm pivot axis; the front end of the at least one hose is vertically higher than the swing arm pivot axis; a rear end of the at least one hose is rearward of the swing arm pivot axis; and the rear end of the at least one hose is at least in part vertically lower than the swing arm pivot axis.

In some embodiments, part of the at least one hose is disposed at a radial distance from the swing arm pivot axis that is less than twice a diameter of the at least one hose.

In some embodiments, the radial distance is less than 1.5 times the diameter of the at least one hose.

In some embodiments, the radial distance is less than the diameter of the at least one hose.

In some embodiments, the at least one hose includes a first hose and a second hose; one of the first and second hoses supplying liquid coolant from the battery cooling channel to the motor cooling channel; and another one of the first and second hoses supplying liquid coolant from the motor cooling channel to the battery cooling channel.

In some embodiments, the vehicle also has a pump fluidly connected between the first hose and the battery cooling channel.

In some embodiments, the battery pack includes: a battery housing defining the battery cooling channel; and a plurality of battery cells housed in the battery housing.

In some embodiments, the battery pack is completely forward of the swing arm pivot axis.

For the purposes of the present application, terms related to spatial orientation such as forward, rearward, front, rear, upper, lower, left, and right, are as they would normally be understood by a driver of the vehicle sitting therein in a normal driving position with the vehicle being upright and steered in a straight ahead direction.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
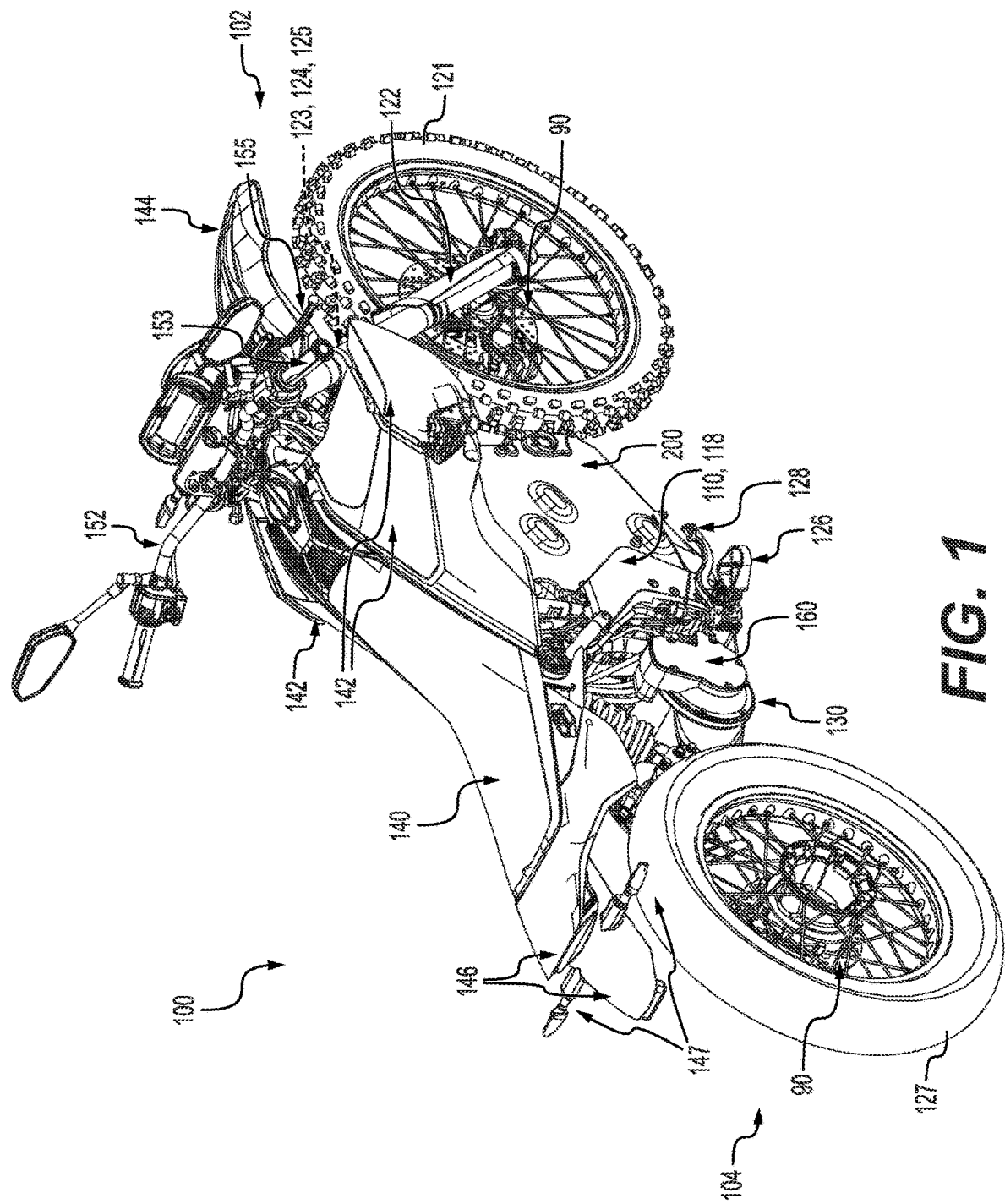
FIG. 1 is a top, rear, right side perspective view of an electric motorcycle according to a non-limiting embodiment of the present technology.

It should be noted that, unless otherwise explicitly specified herein, the drawings are not necessarily to scale.

DETAILED DESCRIPTION

The present technology will be described herein with respect to a straddle-seat electric vehicles, specifically a two-wheeled electric motorcycle 100 and an electric snowmobile 300. Aspects of the present technology could also be implemented in different straddle-seat electric vehicles, such as three-wheeled electric vehicles and all-terrain vehicles (ATVs).

While the motorcycle 100 illustrated herein is a trail style electric motorcycle 100, it is contemplated that motorcycles according to the present technology could vary by a plurality of vehicle characteristics. These vehicle characteristics could include, but are not limited to, a rider posture configuration (also referred to as a rider position), a motorcycle type, tire type, a wheelbase, a steering arrangement, a weight distribution, a squat ratio, a rake angle, a seat height, and a mechanical trail. The rider posture configuration, or rider position, is the relative spacing and position of a rider's hands (when holding the handlebars), the rider's feet (when positioned on the footrests) and the rider's buttocks (when the rider is seated on a seat of the motorcycle). The steering arrangement could also vary and can be described by a variety of parameters, including but not limited to: a length of front suspension travel, a length of rear suspension travel, a front suspension stiffness, a rear suspension stiffness, a front and/or rear wheel size, rake angle, mechanical trail, triple clamp offset, squat ratio, and wheel base.

With reference to FIGS. 1 to 5, the electric motorcycle 100, referred to herein as the vehicle 100, has a front end 102, a rear end 104, and a longitudinal centerplane 103 defined consistently with the forward travel direction of the vehicle 100.

Figure 6:
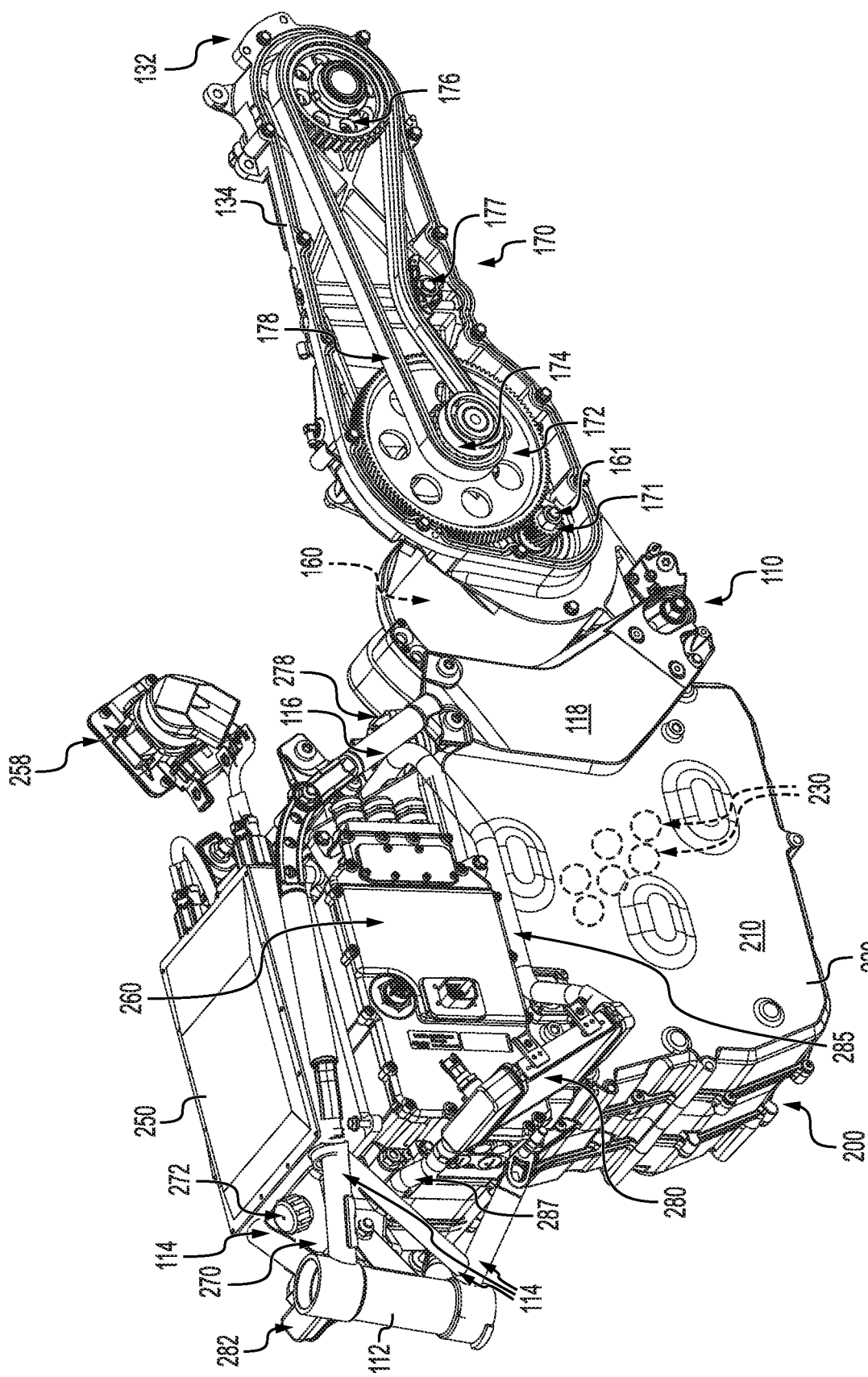
FIG. 6 is a top, front, left side perspective view of a frame, a powerpack, a drivetrain, and a swing arm of the vehicle of claim 1, with a housing cover of the swing arm having been removed.
Figure 7:
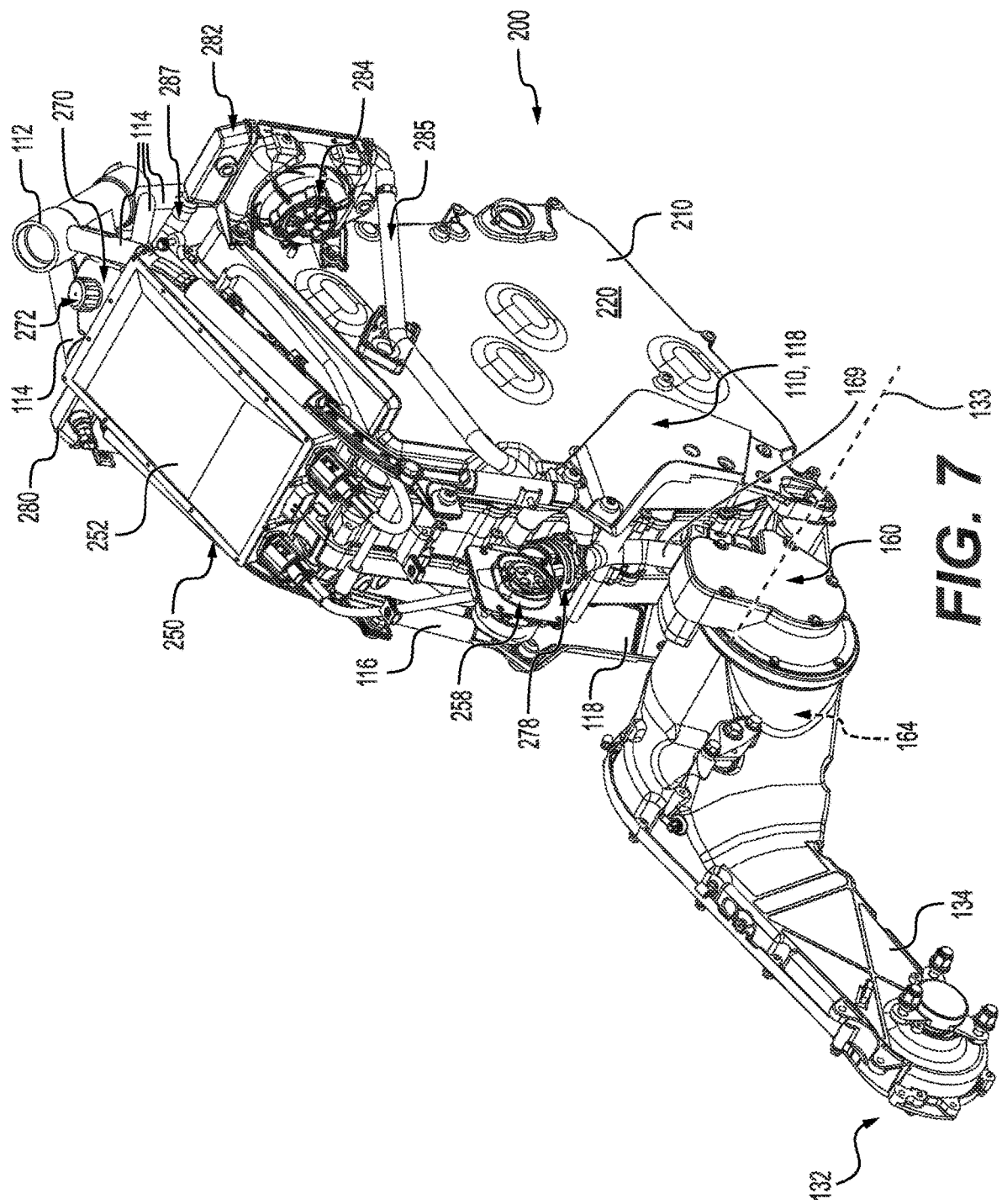
FIG. 7 is a top, rear, right side perspective view of the components of FIG. 6.
Figure 8:
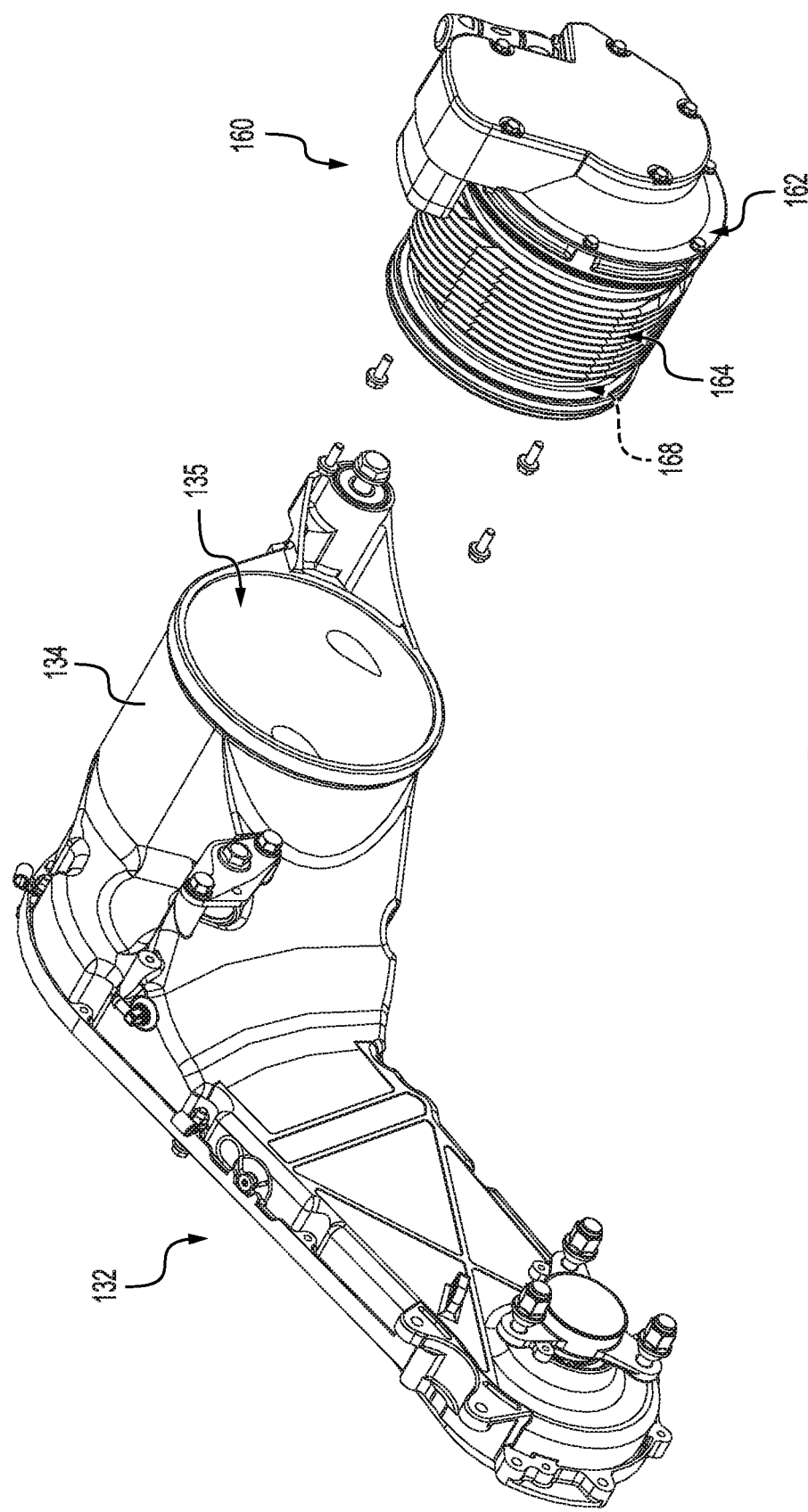
FIG. 8 is a top, rear, right side, exploded, perspective view of a motor and the swing arm of the vehicle of FIG. 1.

The vehicle 100 has a frame 110, shown in additional detail in FIGS. 6 to 8. The frame 110 includes a front suspension receiving portion 112, specifically a tube 112, sometimes referred to as a "head tube", for receiving therethrough a front fork assembly 124 (described in more detail below). Extending rearward from the tube 112, the frame 110 includes forward frame members 114. In the illustrated embodiment, there are six forward frame members 114 (three on each side of the centerplane 103) but it is contemplated that the specific number and arrangement of forward frame members 114 could vary.

The frame 110 also includes two upper intermediate frame members 116 extending rearward from the forward members 114. The frame members 116 are generally hockey-stick shaped, with rear portions of the members 116 curving rearward and downward from generally horizontal forward portions of the members 116. In different embodiments, the frame members 116 could be differently shaped.

The frame 110 further includes two lower intermediate frame members 118 connected to rear ends of the frame members 116. The frame members 118 extend generally vertically along left and right sides of the vehicle 100. The frame members 118 are generally in the shape of flattened boomerangs, but the particular shape could vary. It is contemplated that the frame members 118 could be left and right sides of a common frame bracket.

The frame 110 further includes a rear frame structure 120 (FIGS. 4 and 5) connected to and extending rearward and slightly upward from the upper intermediate frame members 116 and the lower intermediate frame members 118 (omitted from FIGS. 6 to 8). The rear frame structure 120 is also referred to as a seat support structure 120. It is contemplated that the frame 110 could include additional frame members, including but not limited to additional intermediate frame members and additional rear frame members.

The vehicle 100 is a two-wheeled vehicle 100 including a front wheel 121 and a rear wheel 127. The front wheel 121 and the rear wheel 127 each have a tire secured thereto. The front wheel 121 and the rear wheel 127 are centered with respect to the longitudinal centerplane 103.

The front wheel 121 is connected to the frame 110 by a front suspension assembly 123. The front suspension assembly 123 includes a front fork assembly 124 for supporting the front end 102 of the vehicle 100. The front fork assembly 124 includes a triple clamp assembly 125 connected to the tube 112 of the frame 110. The front fork assembly 124 includes a pair of front shocks 122 connected to the triple clamp assembly 125. The front wheel 121 of the front fork assembly 124 is connected to a bottom portion of the pair of front shocks 122.

The rear wheel 127 mounted to the frame 110 by a rear suspension assembly 130. The rear suspension assembly 130 includes a swing arm 132 and a shock absorber 136. The swing arm 132 is pivotally mounted at a front thereof to the frame 110. More specifically, the front of the swing arm 132 is received between lower portions of the lower intermediate frame members 118. The swing arm 132 pivots relative to the lower intermediate frame members 118 about a swing arm pivot axis 133 that extends through the lower intermediate frame members 118. As best seen in FIG. 6, the swing arm 132 includes a swing arm housing 134, in which is disposed an electric motor 160 and a drivetrain 170. The swing arm 132 includes a housing cover 137 selectively removable from the housing 134. The swing arm housing 132 and the housing cover 137 enclose the drivetrain 170. When the housing cover 137 is in place, the drivetrain 170 is bathed in lubricant within the swing arm 132.

The rear wheel 127 is rotatably mounted to the rear end of the swing arm 132 which extends on a left side of the rear wheel 127. The shock absorber 136 is connected between the swing arm 132 and the frame 110, specifically to the intermediate frame members 116. It is contemplated that the relative arrangement of the shock absorber 136 and the frame 110 could vary in different embodiments. The electric motor 160 and the drivetrain 170 will be described in more detail below.

The vehicle 100 has a straddle seat 140 mounted to the frame 110, specifically to the rear frame structure 120, and disposed along the longitudinal centerplane 103. In the illustrated implementation, the straddle seat 140 is intended to accommodate a single adult-sized rider, i.e. the driver. It is however contemplated that the seat 140 could be longer or that a passenger seat portion could be connected to the rear frame structure 120 in order to accommodate a passenger behind the driver. Depending on the particular implementation, it is also contemplated that the seat 140 could be supported by an assembly of frame members or tubes, a molded portion integrally connected to the seat 140, or body panels of the motorcycle 100.

Figure 2:
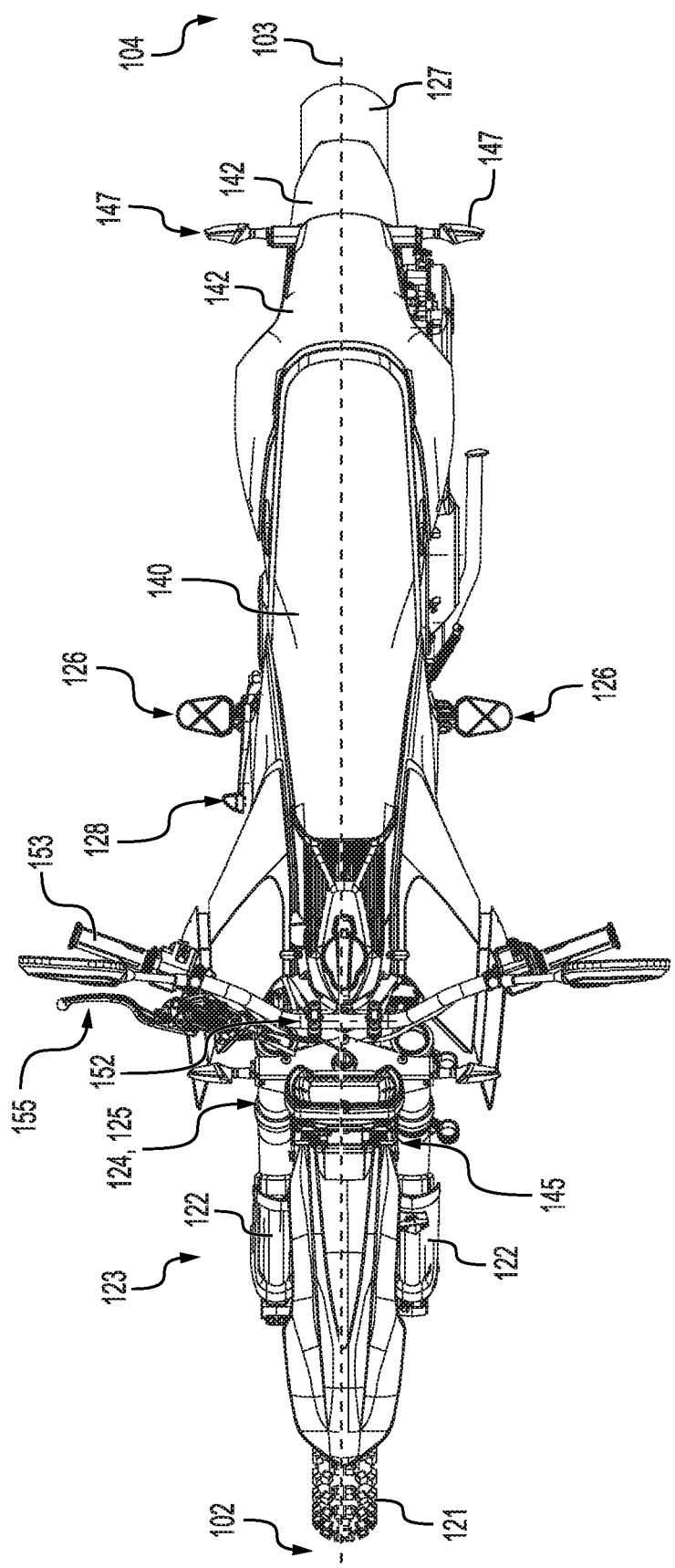
FIG. 2 is a top plan view of the vehicle of FIG. 1.
Figure 3:
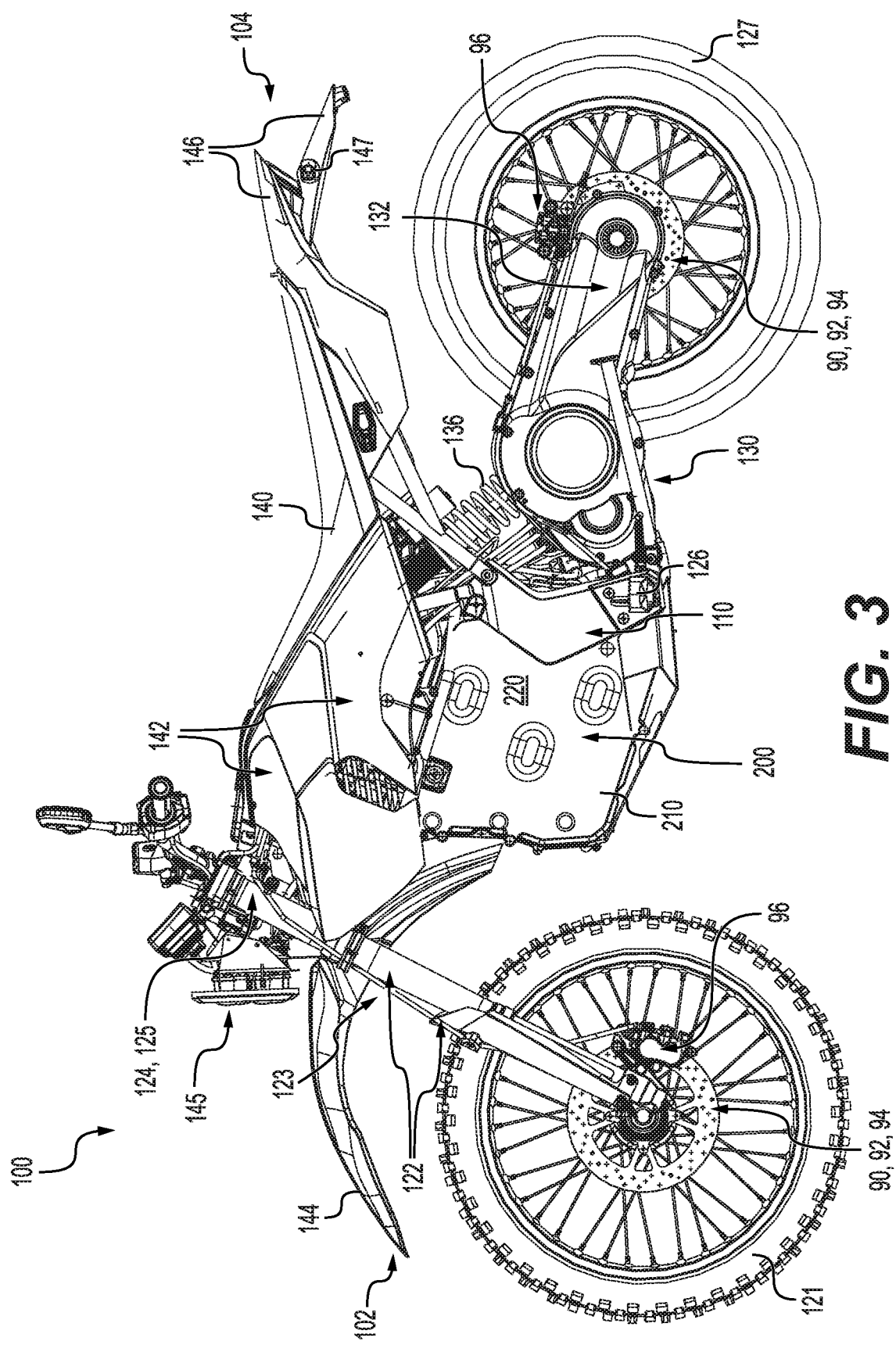
FIG. 3 is left side elevation view of the vehicle of FIG. 1.

The vehicle 100 further includes a plurality of body panels 142 for forming the body of the vehicle 100, illustrated in FIGS. 1 to 3. The body panels 142 are connected to and supported by the frame members 114, 116. The body panels 142 enclose and protect some internal components of the vehicle 100 such as a powerpack 200 (described further below). The vehicle 100 also includes a front fender 144 disposed at the front of the vehicle 100 and extending partially over the front wheel 121. Rearward of the seat 140, the vehicle 100 also has rear fender panels 146 extending at least partially over rear wheel 127. The vehicle 100 includes front headlights 145 attached to the front fork assembly 124 and electrically connected to a battery pack 210 (described further below). The vehicle 100 also has rear braking and indicator lights 147 supported by the rear panels 146 and electrically connected to the battery pack 210.

Depending on the particular embodiment, especially between different motorcycle types (trail-style motorcycle or cruiser-style motorcycle for example), the body panels 142 and the fenders 144, 146 could be different in shape and number. For example, some embodiments of the vehicle 100 could include a mud flab connected to a rear edge of one of the body panels 142. It is further contemplated that one or both of the fenders 144 and rear panels 146 could be omitted in some cases.

A driver footrest 126 is disposed on either side of the vehicle 100 and vertically lower than the straddle seat 140 to support the driver's feet. The driver footrests 126 are connected to the frame members 118. It is contemplated that the footrests 126 could be implemented in various forms other than those illustrated, including but not limited to pegs and footboards. It is contemplated that the vehicle 100 could also be provided with one or more passenger footrests disposed rearward of the driver footrest 126 on each side of the vehicle 100, for supporting a passenger's feet when a passenger seat portion for accommodating a passenger is connected to the vehicle 100. A brake pedal 128 is connected to the right driver footrest 126 for braking the vehicle 100. The brake pedal 128 extends upwardly and forwardly from the right driver footrest 126 such that the driver can actuate the brake pedal 128 with a front portion of the right foot while a rear portion of the right foot remains on the right driver footrest 126.

Figure 4:
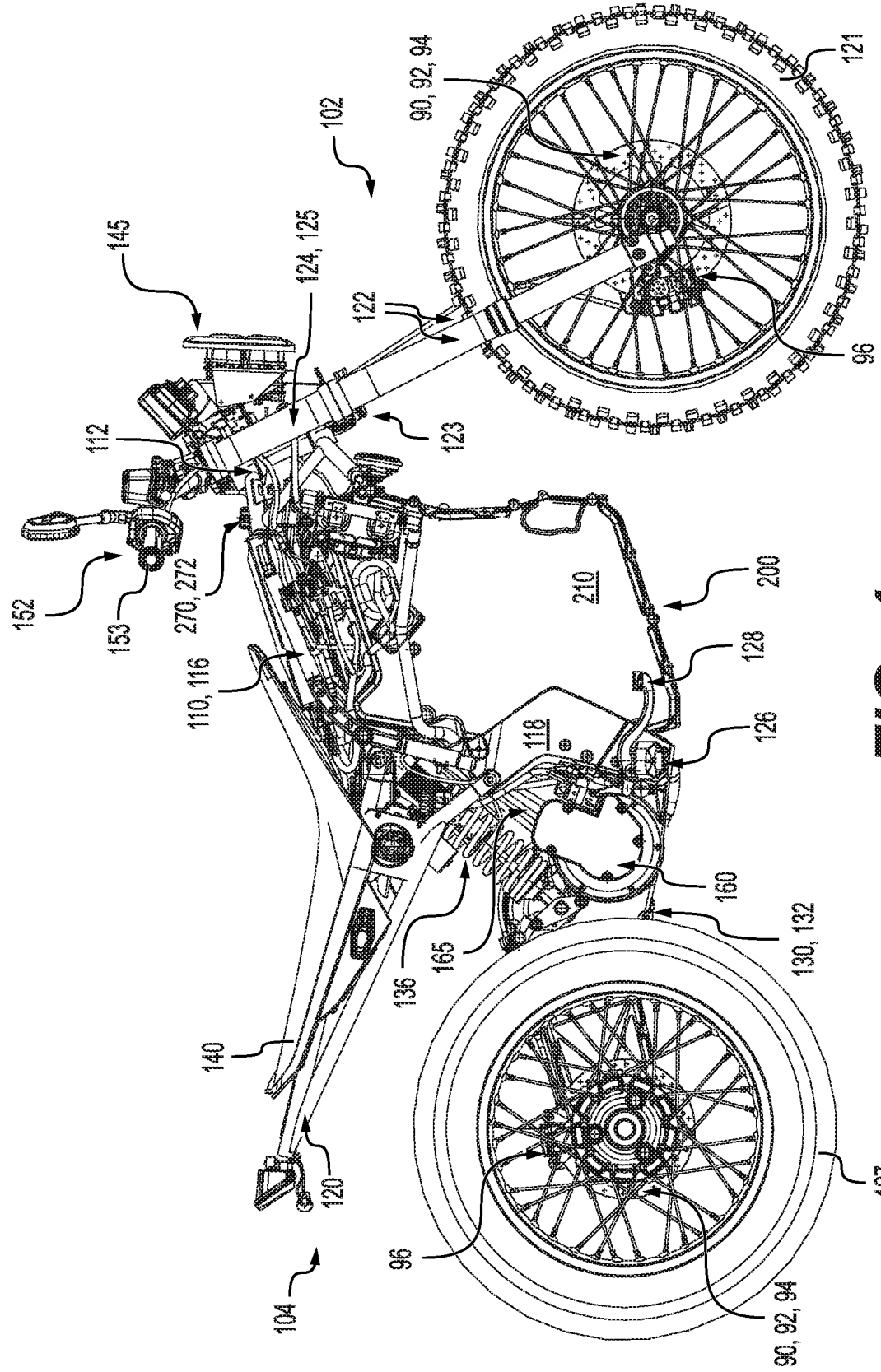
FIG. 4 is a right side elevation view of the vehicle of FIG. 1, with body panels having been removed.
Figure 5:
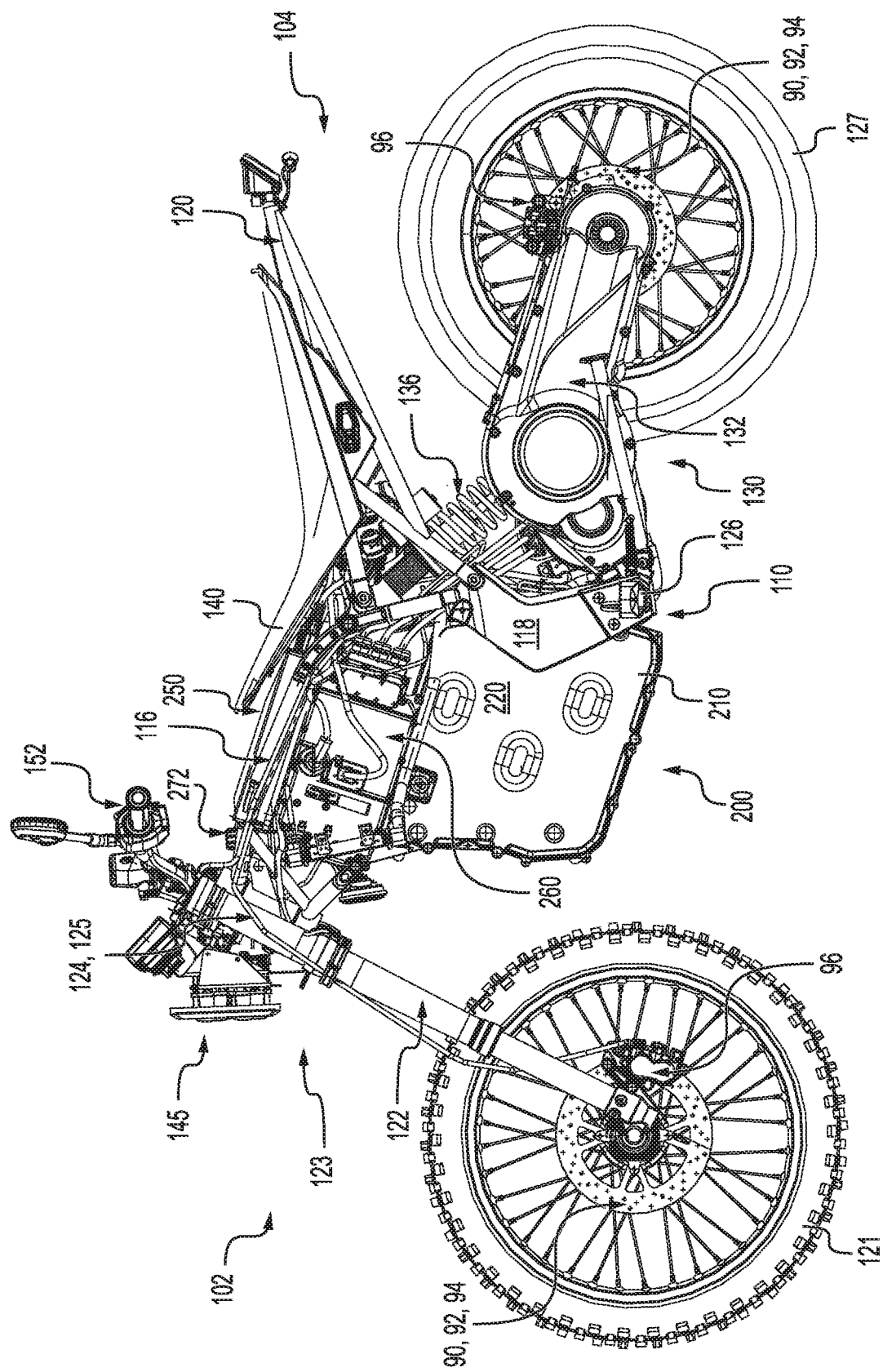
FIG. 5 is a left side elevation view of the vehicle of FIG. 1, with body panels having been removed.

With reference to FIGS. 3 to 5, each of the front wheel 121 and the rear wheel 127 is provided with a brake assembly 90. The brake assemblies 90 of the wheels 121, 127, along with the brake pedal 128, form part of a brake system 92. Each brake assembly 90 is a disc-type brake mounted onto the spindle of the respective wheel 121 or 127. Other types of brakes are contemplated. Each brake assembly 90 includes a rotor 94 mounted onto the wheel hub and a stationary caliper 96 straddling the rotor 94. The brake pads (not shown) are mounted to the caliper 96 so as to be disposed between the rotor 94 and the caliper 96 on either side of the rotor 94. The brake pedal 128, as well as a hand-operated brake lever 155 described below, are operatively connected to the brake assemblies 90 provided on each of the front wheel 121 and the rear wheel 127. The brake system 92 further includes a regenerative braking system (not shown) that uses the electric motor 160 as a generator to charge battery cells of the battery pack 210 while slowing the vehicle 100.

Returning to FIGS. 1 to 5, the vehicle 100 includes a handlebar assembly 152 operatively connected to the front fork assembly 124 and disposed in front of the seat 140. The handlebar assembly 152 is used by the rider to turn the front wheel 121, via the front fork assembly 124, to steer the vehicle 100. Specifically, the handlebar assembly 152 is connected to a top end of the triple clamp assembly 125. The handlebar assembly 152 and the triple clamp assembly 125 define a steering axis about which the front wheel 121 turns to steer the vehicle 100. A twist-grip throttle 153 is operatively connected on the right side of the handlebar assembly 152 for controlling vehicle speed. It is contemplated that the twist-grip throttle 153 could be replaced by a throttle lever or some other type of throttle input device. The twist-grip throttle 153 could be disposed on the left side of the handlebar assembly 152 in some embodiments. The handlebar assembly 152 also includes the brake lever 155 on a right side for activating the brake assemblies 90.

It is contemplated that the vehicle 100 could include a variety of different features excluded from discussion here, including but not limited to: a windscreen, radio and/or navigational systems, and luggage rack systems.

The vehicle 100 further includes an electronic powerpack 200, an electric motor 160, and a drivetrain 170 for driving the vehicle 100, specifically the rear wheel 127. The powerpack 200 will be described in more detail below.

With reference to FIGS. 6 to 10, the electric motor 160 is disposed in the swing arm 132. As the swing arm 132 pivots relative to the frame 110, the motor 160 moves with the swing arm 132. In the present embodiment, the motor 160 is a three-phase electric motor 160. It is contemplated that different types of motors could be used in some embodiments.

The swing arm housing 134 defines a motor cavity 135 therein in which the motor 160 is disposed (FIG. 8). The motor 160 is operatively connected to the drivetrain 170 disposed in the swing arm 132, as is illustrated in FIG. 6, in which the housing cover 137 has been removed to show the drivetrain 170. An output shaft 161 of the motor 160 has a gear 171 disposed thereon for engaging the drivetrain 170. The drivetrain 170 includes a gear wheel 172, a front sprocket 174 connected to the gear wheel 172 and a rear sprocket 176. The sprocket 174 engages a belt 178 which in turn engages the sprocket 176. A belt tensioner 177 presses against the lower part of the belt 178 between the sprockets 174, 176.

Power is provided to the motor 160 by the electronic powerpack 200. Illustrated in additional detail in FIGS. 6, 7, 10, and 12, the powerpack 200 is supported by the frame 110. In the present embodiment, the powerpack 200 is connected to the frame members 118 but different embodiments could have different structural arrangements for connecting the powerpack 200 to the frame 110.

Figure 13:
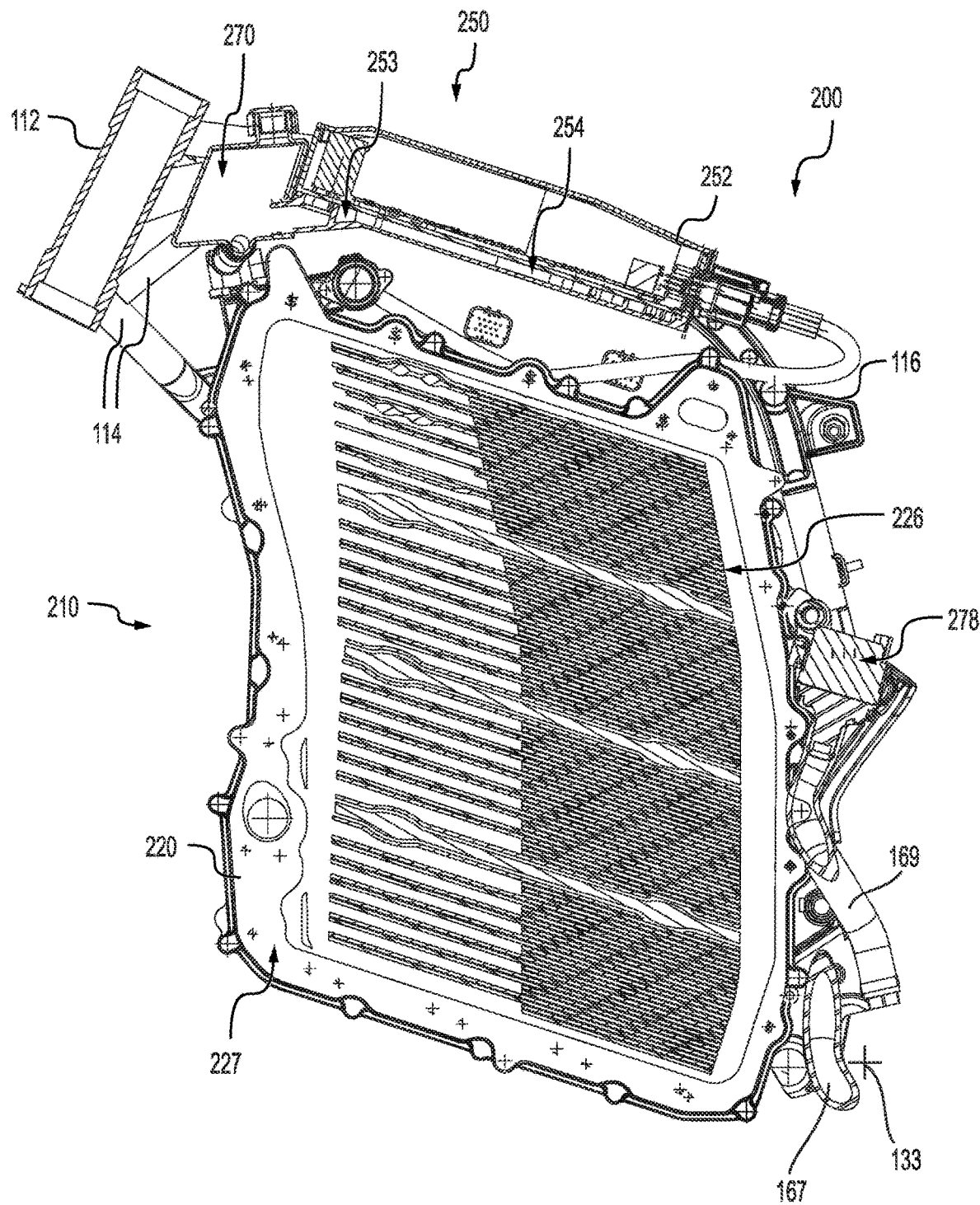
FIG. 13 is a cross-sectional view of portions of the powerpack of FIG. 6, taken along line 13-13 of FIG. 9.

The powerpack 200 includes a battery pack 210. The battery pack 210 includes a battery housing 220. The battery housing 220 is fastened to the frame 110 to support the powerpack 200 in the illustrated embodiment. As best seen in FIG. 13, in the present embodiment, the battery pack 210 is completely forward of the swing arm pivot axis 133. The battery pack 210 includes a plurality of battery cells 230 housed in the battery housing 220, illustrated schematically in FIGS. 6 and 16. Depending on the particular implementational details of a given embodiment of the vehicle 100, the specific implementation details of the battery pack 210 and/or the plurality of battery cells 230 could vary. For example, battery cells could vary in nominal energy capacity, usable energy capacity, discharge rate, cell chemistry and cell type.

The powerpack 200 includes a charger 250 connected to the battery pack 210. The charger 250 includes a charger housing 252 surrounding internal electronic components (not shown) of the charger 250. The charger 250 is mounted to the battery housing 220. Specifically, the charger housing 252 is fastened to the battery housing 220 and is disposed on a top side of the battery housing 220. It is contemplated that the location of the charger 250 relative to the battery pack 210 could vary.

The charger 250 is electrically connected to the battery cells 230 for supplying charge to the battery cells 230. The vehicle 100 includes a socket 258 electrically connected to the charger 250 for electrically connecting to an external power source for providing electricity to the charger 250 for charging the battery cells 230. The socket 258 is disposed generally rearward of the charger 250 and extends at least partially through one of the body panels 142, but the specific location could vary.

The powerpack 200 also includes an inverter 260 disposed on a left side of the battery pack 210. The inverter 260 includes an inverter housing 262 which is fastened to the battery housing 220, specifically along a left side of the battery housing 220. As such, the inverter 260 is mounted to the battery housing 220. In some embodiments, it is contemplated that the inverter 260 could be disposed on a different side of the battery pack 210.

Figure 17:
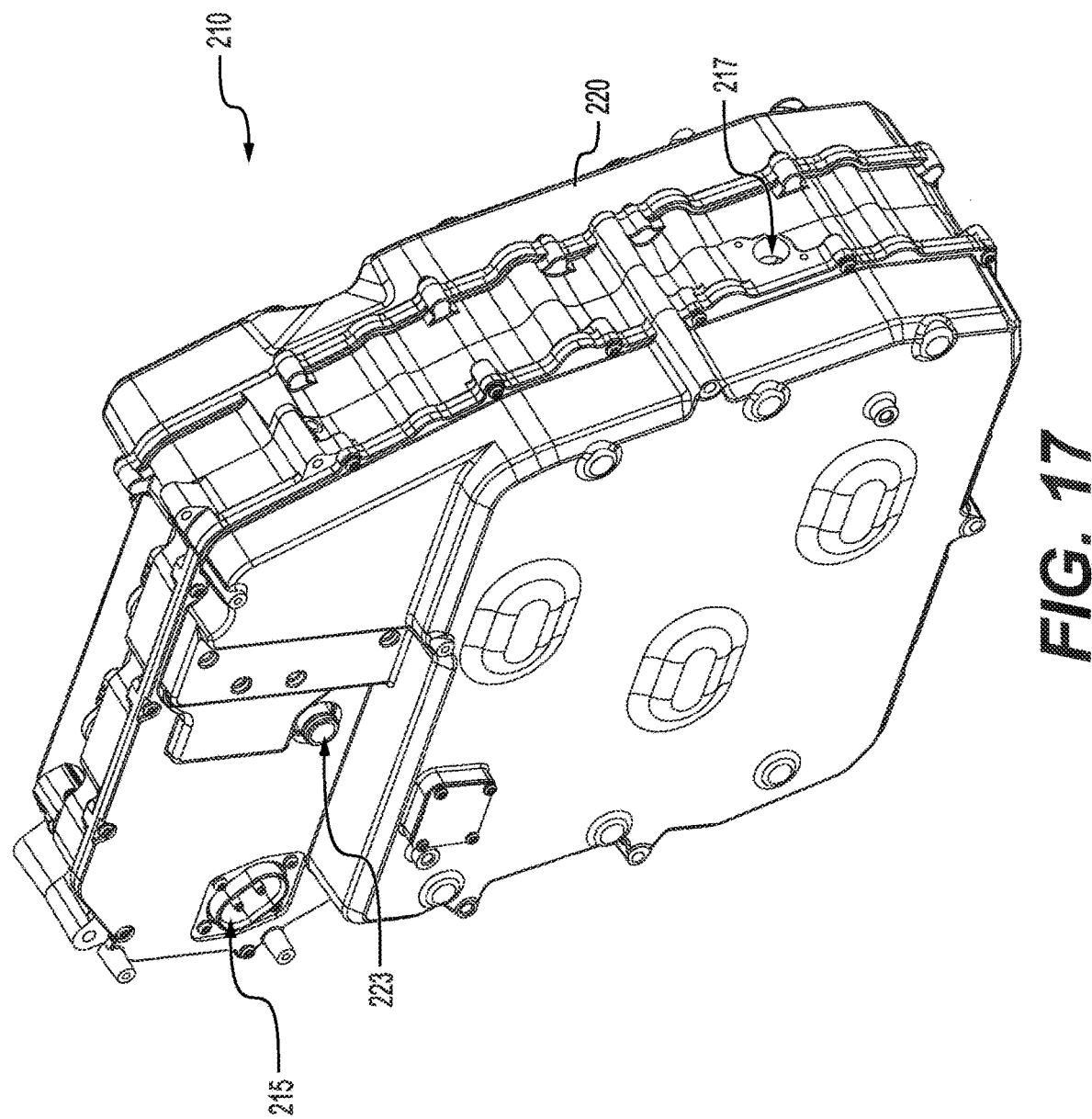
FIG. 17 is a rear, left side perspective view of a battery pack of the powerpack of FIG. 6.
Figure 18:
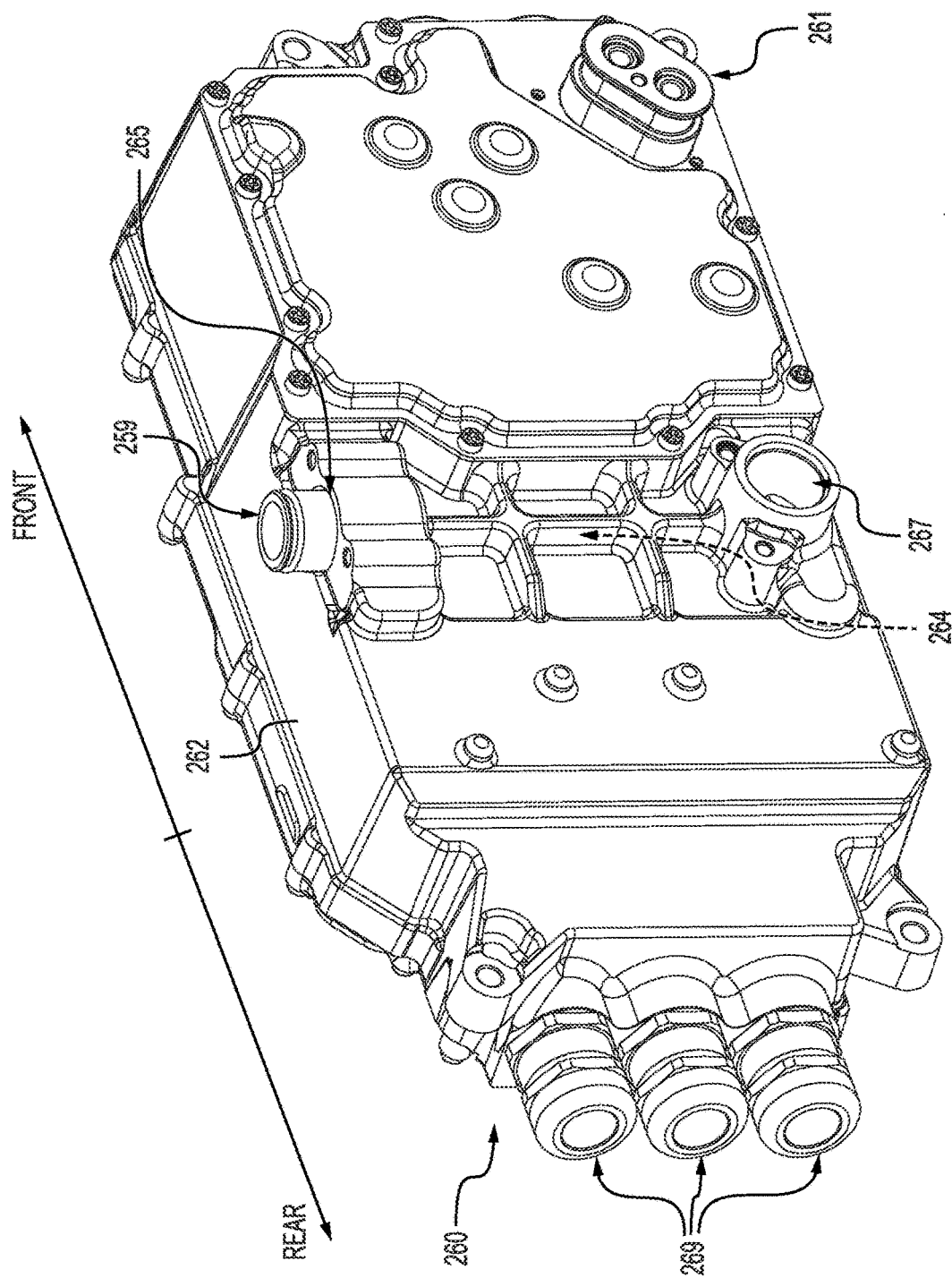
FIG. 18 is a top, rear, right side perspective view of an inverter and a rigid connector of the powerpack of FIG. 6.

In order to electrically connect to the battery cells 230 in the battery pack 210, the inverter 260 includes an electric connector 261 disposed on an exterior of the invertor housing 262 (see FIG. 18). The battery pack 210 includes an electric connector 215 electrically connected to the battery cells 230 and disposed on an exterior of the battery housing 220, specifically on a left side of the housing 220 (see FIG. 17). When the vehicle 100 is in operation, the inverter 260 receives electric power from the battery cells 230 via the electric connector 215 and the electric connector 261.

The connector 215 is arranged to receive the connector 261 of the inverter 260, such that the electric connector 215 and the electric connector 261 are selectively connected together for managing electricity flow from the battery pack 210 to other electronic components of the vehicle 100. As can be seen in at least FIG. 6, the inverter 260 is electrically connected to the three-phase motor 160 via three power cords 165 connected to three outlets 269 of the inverter 260. The number of cords or type of electrical connection between the inverter 260 and the motor 160 could vary in different embodiments. While the inverter 260 connects directly to the battery pack 210 in the present embodiment, it is contemplated that the inverter 260 could be separated and spaced from the battery pack 210 and electrically connected to the battery cells 230 via power cords or the like.

Figure 11:
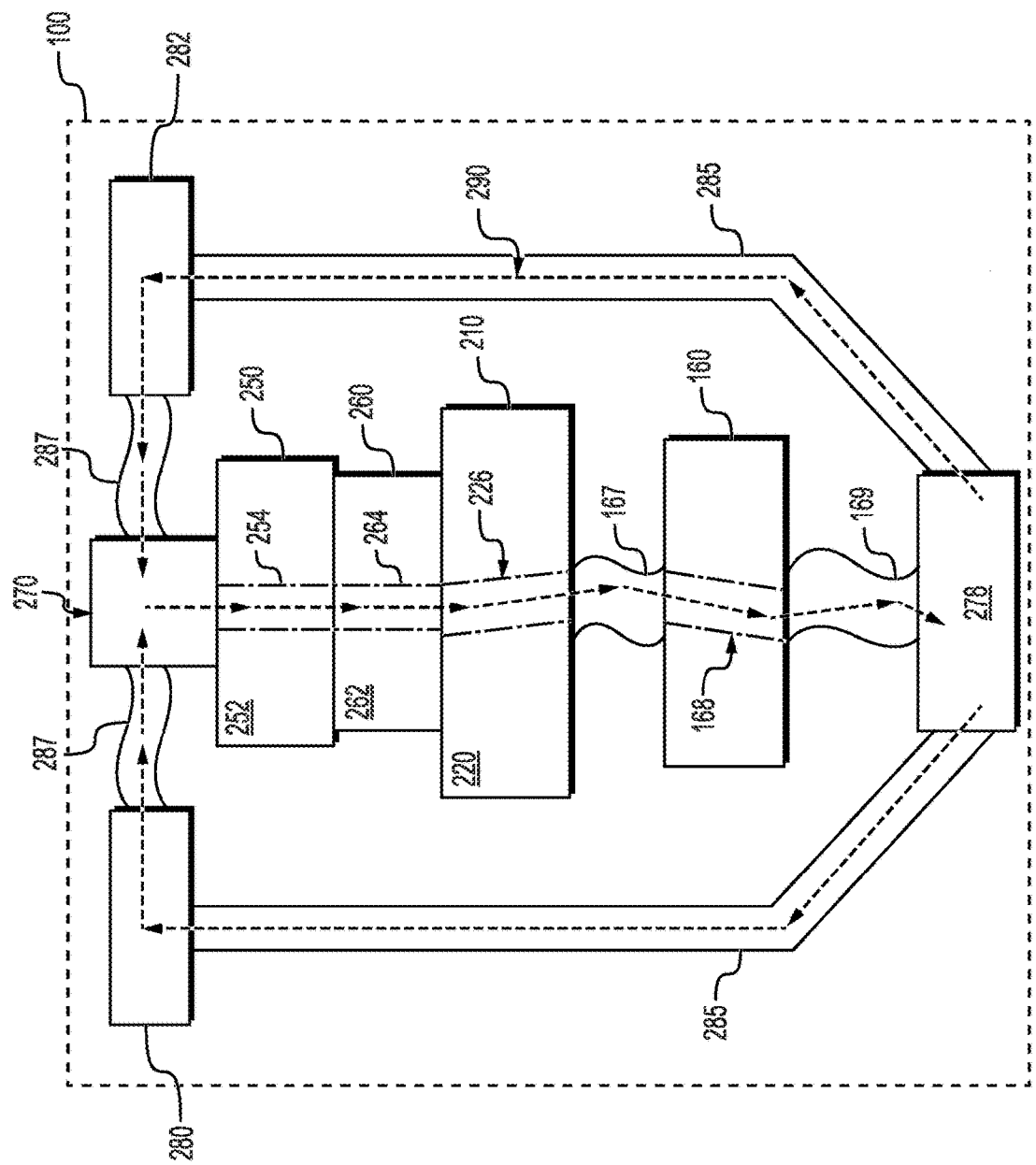
FIG. 11 is a schematic diagram of a cooling circuit of the vehicle of FIG. 1.

According to non-limiting embodiments of the present technology, the vehicle 100 includes a cooling circuit 290, illustrated schematically in FIG. 11, for cooling electronic components of the vehicle, including the powerpack 200 and the motor 160. With additional reference to FIGS. 12 to 18, the cooling circuit 290 is in the form of a closed fluid cooling loop 290 for absorbing heat from the motor 160 and components of the powerpack 200. Heat transfer in the cooling circuit 290 is provided by a liquid coolant, generally a glycol-water coolant, although it is contemplated that different liquid coolants could be utilized. It is noted that while liquid coolant is provided, some gases may also be present in the cooling circuit 290, due to phase transitions or air infiltrations.

In some embodiments, it is contemplated that the cooling circuit 290 could be limited to the powerpack 200 and cooling of the motor 160 could be provided by other means. It is also contemplated that some components of the powerpack 200 could be omitted from the cooling circuit 290 and cooling could be provided by other means. For example, some components of the vehicle 100 could be cooled through air cooling.

The vehicle 100 includes a coolant reservoir 270 connected to the powerpack 200 and fluidly connected to the cooing circuit 290. The reservoir 270 receives liquid coolant therein and supplies coolant to the cooling circuit 290. It is noted that the cooling circuit 290 is considered a "closed loop" in that the coolant flowing through the cooling circuit 290 absorbs heat from heat-generating components and radiates that heat away using heat exchangers (described below) without exchanging the coolant fluids. The reservoir 270 includes a reservoir cap 272 selectively connected thereto. The reservoir 270 provides for coolant to be refilled or supplemented if necessary. When the cap 272 is removed, additional coolant fluid can be added to the reservoir 270 to supplement the fluid level of coolant in the cooling circuit 290. It is contemplated that the coolant reservoir 270 could be omitted in some embodiments and that coolant fluid could be added elsewhere in the cooling circuit 290.

Figure 12:
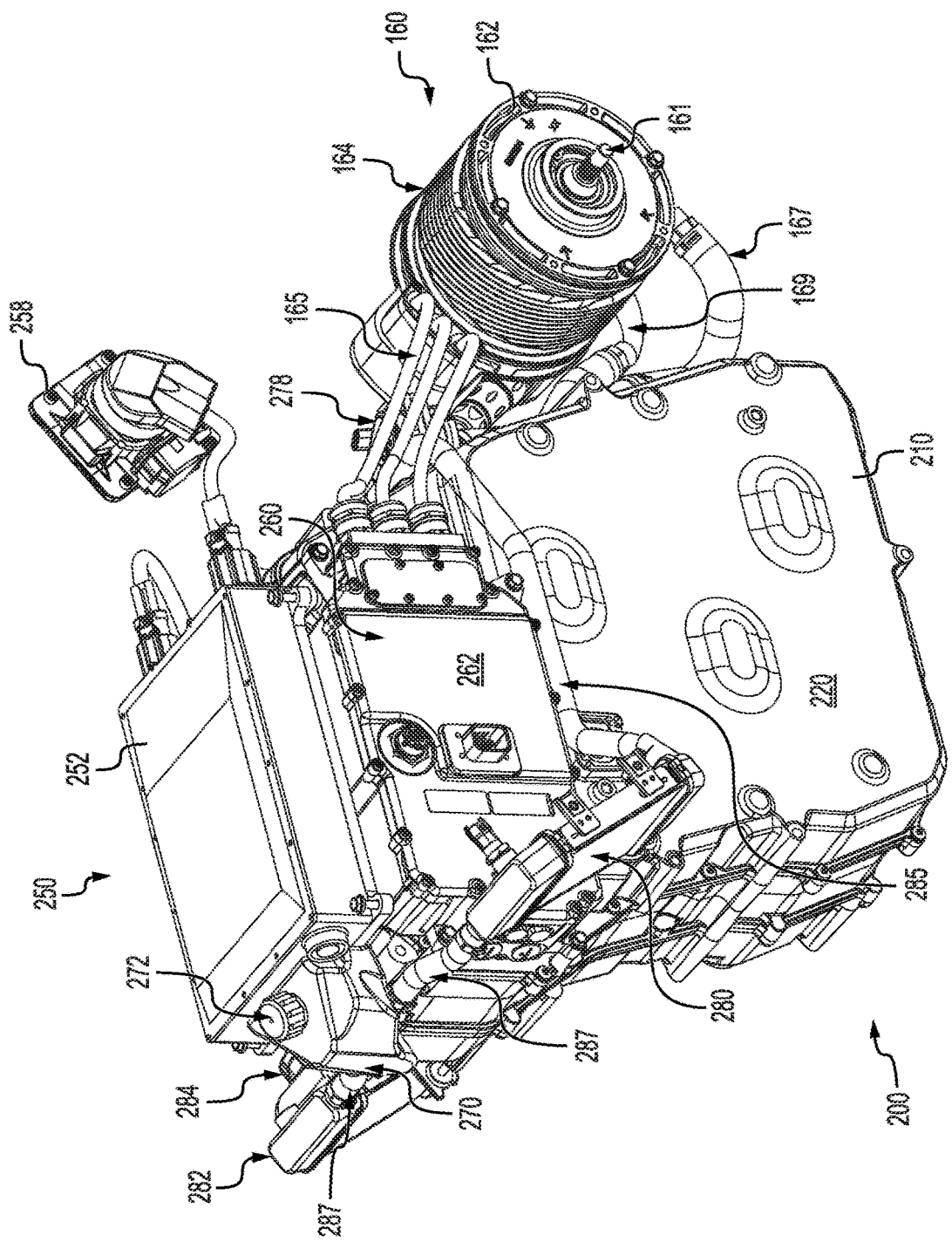
FIG. 12 is a top, front, left side perspective view of the powerpack, the motor, and the cooling circuit components of the vehicle of FIG. 1.

As can be seen in FIG. 12, the reservoir 270 is disposed partially forward of the powerpack 200. It is contemplated that the exact positioning of the reservoir 270 could vary in different embodiments. The reservoir 270 is supported by the powerpack 200; specifically the reservoir 270 is connected to the charger 250 (described further below). It is contemplated that the reservoir 270 could be supported by a different component of the powerpack 200 or the vehicle 100. For example, it is contemplated that the reservoir 270 could be connected to and/or supported by the frame 110 in some embodiments.

Figure 14:
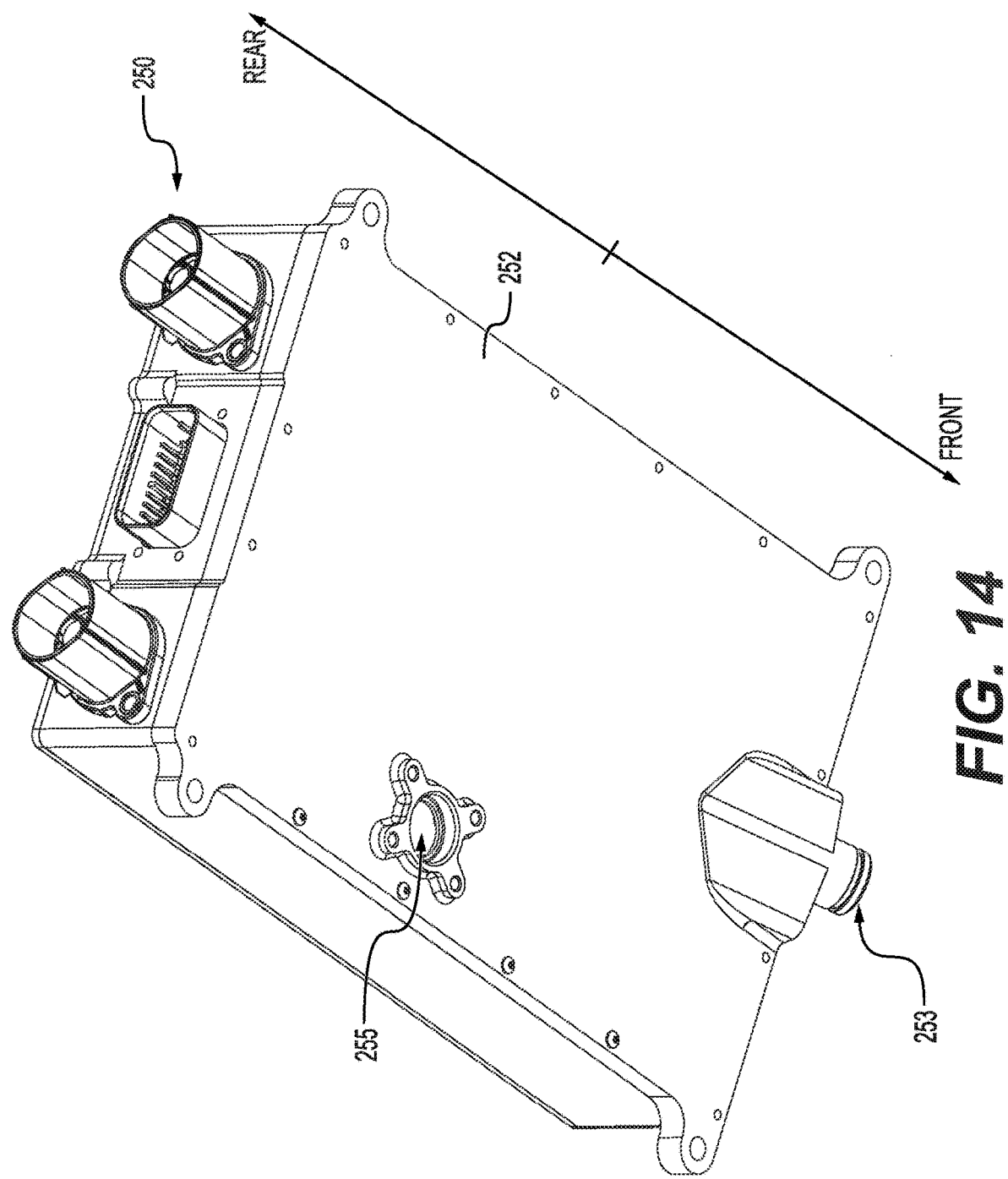
FIG. 14 is a bottom, rear, left side perspective view of a charger of the powerpack of the vehicle of FIG. 1.
Figure 15:
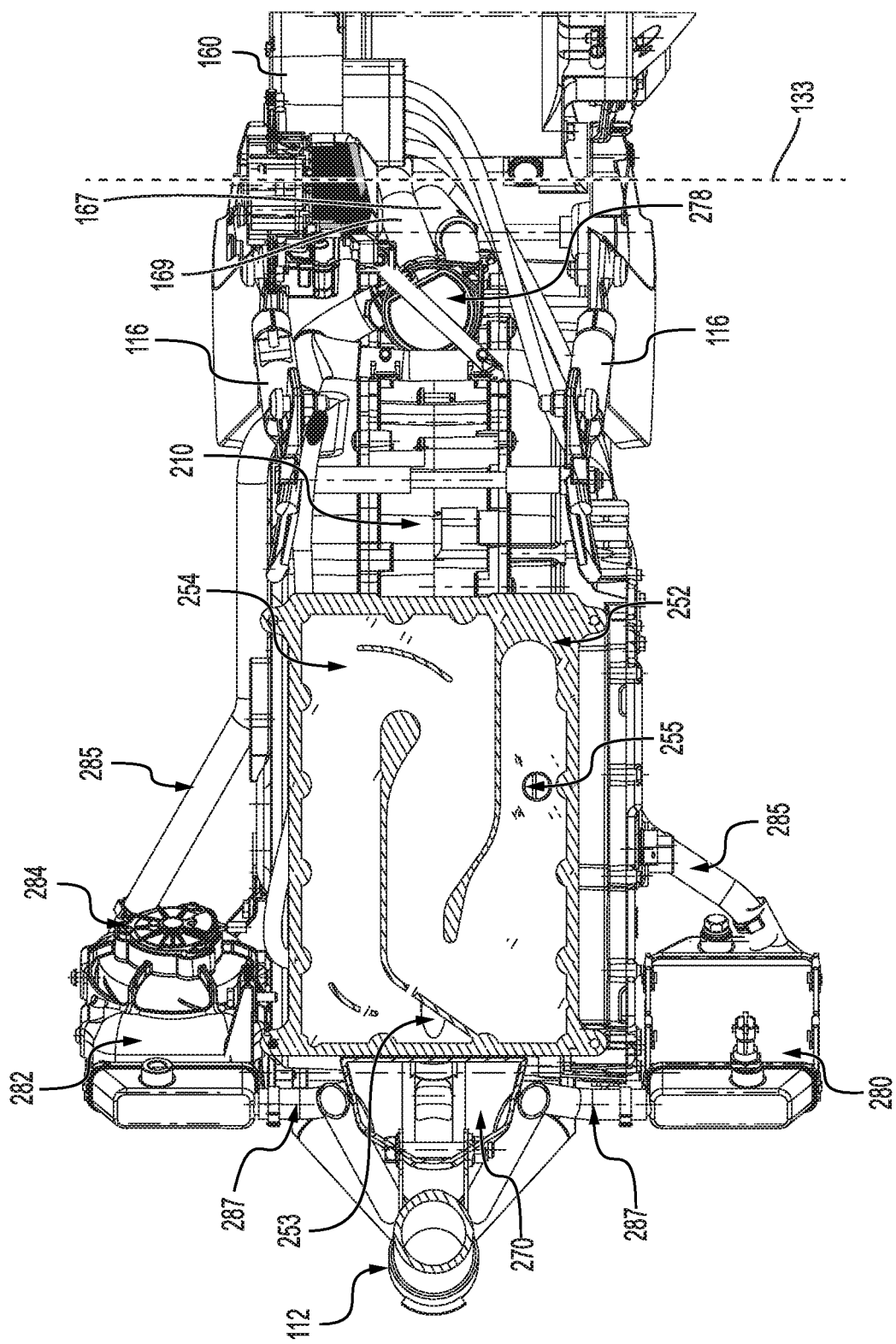
FIG. 15 is a cross-sectional view of portions of the powerpack of FIG. 6, taken along line 15-15 of FIG. 10.

With reference to FIGS. 13 to 15, the charger housing 252 defines a charger cooling channel 254 therein. The charger cooling channel 254 extends generally horizontally along a bottom side of the charger 250. As such, the charger cooling channel 254 extends along a side of the charger 250 facing an interior of the powerpack 200. The shape of the present embodiment of the channel 254 is illustrated cross-section in FIG. 15, but it is contemplated that the exact shape could vary.

As seen in FIG. 13, the charger 250 includes a channel inlet 253 that is defined in a front, bottom portion of the housing 252. The inlet 253 is fluidly connected to the channel 254. The inlet 253 extends downward and forward, into the coolant reservoir 270, thereby forming a rigid fluid connection between the charger cooling channel 254 and the coolant reservoir 270. In such an arrangement, coolant flows from the reservoir 270 to the charger cooling channel 254 without the use of piping or hose between the reservoir 270 and the charger 250. A channel outlet 255 (FIGS. 14 and 15) is defined on the bottom side of the charger housing 252 and is fluidly connected to the channel 254.

Figure 16:
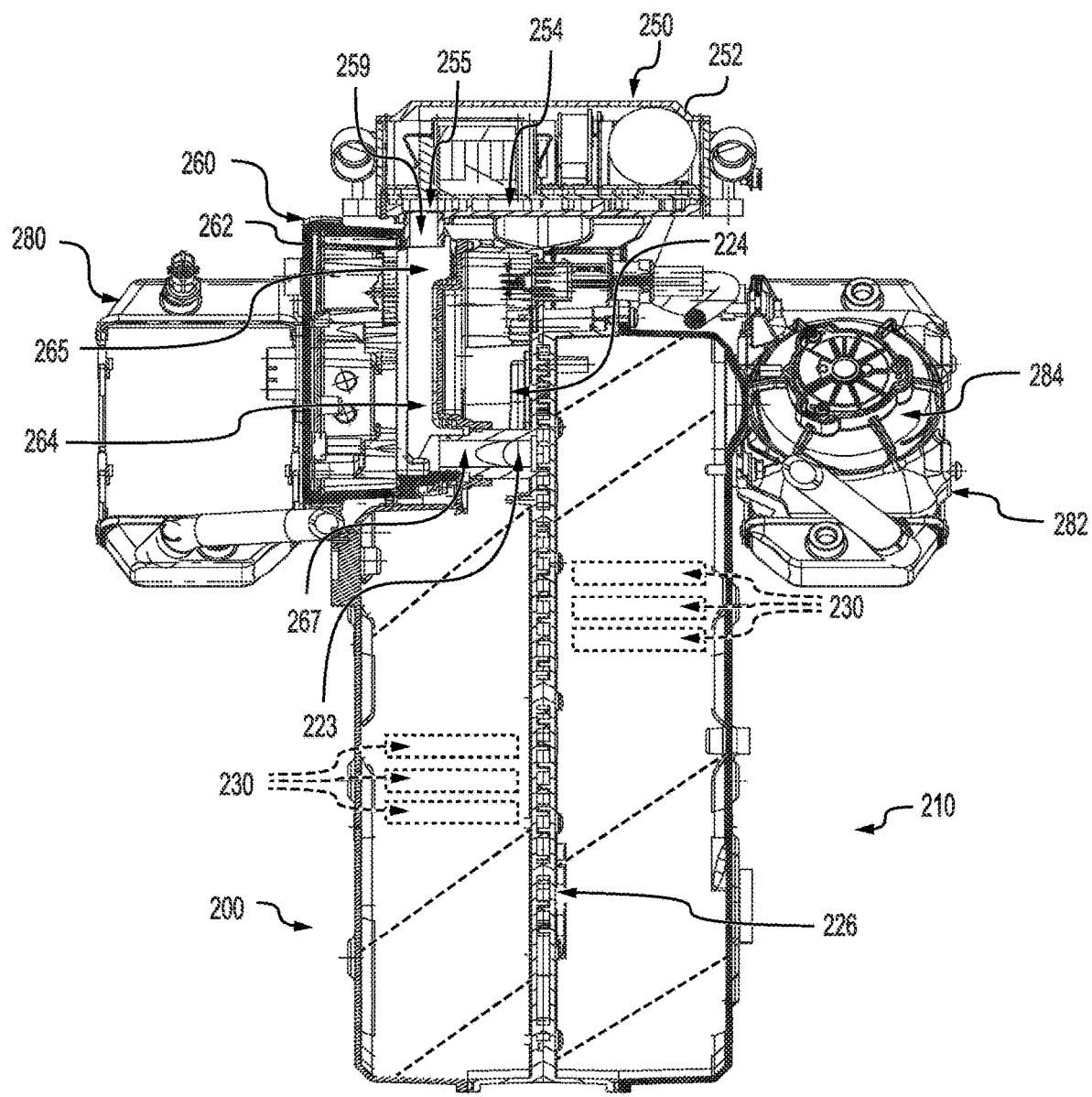
FIG. 16 is a cross-sectional view of portions of the powerpack of FIG. 6, taken along line 16-16 of FIG. 10, with battery cells therein being illustrated schematically.

With reference to FIGS. 16 and 18, the inverter housing 262 defines an inverter cooling channel 264 therein. The inverter cooling channel 264 extends generally vertically along and across a right side of the inverter 260. As such, the inverter cooling channel 264 extends along a side of the inverter 260 facing the interior of the powerpack 200. The shape of the present embodiment of the channel 264 is illustrated in FIGS. 16 and 18, but it is contemplated that the exact shape could vary.

The inverter 260 defines a channel inlet 265 on a top side of the housing 262, fluidly communicating with the channel 264. As can be seen in FIG. 16, the inlet 265 is disposed below the outlet 255 of the charger cooling channel 254. In the present embodiment, the powerpack 200 further includes a rigid tube 259, also referred to as a ring 259, for fluidly and rigidly connecting the charger cooling channel 254 to the inverter cooling channel 264. It is contemplated that the housings 252, 262 could be formed to fit sealingly directly together, omitting the tube 259. The inverter 260 also defines a channel outlet 267 on a right side of the housing 262, fluidly communicating with the channel 264.

As is illustrated in more detail in FIGS. 13 and 16, the battery housing 220 defines a battery cooling channel 226 therein. The battery cooling channel 226 extends through a center portion of the battery pack 210, in the interior of the powerpack 200. As can be seen in the cross-sectional views of FIGS. 13 and 16, the battery cooling channel 226 includes a plurality of fins extending inward from the housing 220 and coolant fluid flows along a longitudinal direction through a center portion 227 of the housing 220, along the direction of the centerplane 103, as well as along a vertical/lateral plane of the vehicle 100 (orthogonal to the centerplane 103), descending toward a battery cooling channel outlet 217 (FIG. 17). By being disposed in the center portion 227 of the housing 220, the channel 226 is in thermal communication with banks of battery cells 230 disposed on both a right side of the channel 226 and a left side of the channel 226.

The battery pack 210 includes a channel inlet 223 formed by the battery housing 220, the inlet 223 fluidly communicating with the channel 226 (see FIGS. 16 and 17). The housing 220 also defines a channel portion 224 extending from the inlet 223 to the generally vertically extending cooling channel 226. In some embodiments, the channel portion 224 could be omitted, with the inlet 223 aligning with a top portion of the vertically extending channel 226 for example.

As can be seen in FIG. 16, the outlet 267 of the inverter cooling channel 264 is connected to the inlet 223 of the battery cooling channel 226. The housings 262, 220 fit sealingly together, such that the inverter cooling channel 264 and the battery cooling channel 226 fluidly connected together by a rigid fluid connection formed by the housings 262, 220. In the illustrated embodiment, the electric connector 261 and the inverter channel outlet 267 are disposed on a same side of the inverter 260. In this arrangement, both the cooling connection and the electrical connection between the inverter 260 and the battery pack 210 are internal to the powerpack 200. As is further illustrated in FIG. 16, connections between the battery cooling channel 226, the inverter cooling channel 264, and the charger cooling channel 254 are internal to the powerpack 200. In this way, no hoses are required to make these connections, and the connections between the channels 226, 264, 254 are generally protected from interference from external to the vehicle 100.

It is noted that the terms "inlet" and "outlet" are not meant to limit the direction of flow through the charger 250, the inverter 260, and the battery pack 210. In embodiments where the direction of flow of coolant through the cooling circuit 290 is reversed, coolant would flow into the openings labelled outlets, including the charger channel outlet 255, the inverter channel outlet 267, and the battery channel outlet. Similarly, with the flow through the cooling circuit 290 reversed, coolant could flow out of the openings labelled inlets, including the charger channel inlet 253, the inverter channel inlet 265, and the battery channel inlet 223.

With reference to FIGS. 8 and 12, the electric motor 160 includes a motor housing 162. The motor housing 162 includes a channeled outer surface 164 in thermal contact with at least some internal components, including at least a stator and a rotor (not shown), of the motor 160. The vehicle 100 thus includes a motor cooling channel 168 (shown schematically in FIG. 11) for cooling the electric motor 160. The channel 168 is formed between the channeled outer surface 164 and an internal surface of the motor cavity 135 in which the motor 160 is disposed. The motor cooling channel 168 formed by the channeled outer surface 164 forms a spiral winding around an exterior of the electric motor 160. In some embodiments, the shape of the channel 168 could vary.

The motor cooling channel 168 is fluidly connected to the battery cooling channel 226 and forms a portion of the cooling circuit 290. Specifically, the motor cooling channel 168 is connected to the channel outlet 217 of the battery cooling channel 226 by a flexible tube 167, also referred to as a hose 167. With reference to FIGS. 10, 12, 13 and 15, with the vehicle 100 at rest, a front end of the hose 167 is forward and vertically higher than the swing arm pivot axis 133 and a rear end of the hose 167 is rearward of the swing arm pivot axis 133 and in part vertically lower than the swing arm pivot axis 133. The hose 167 extends in a space defined laterally between the frame members 118 and longitudinally between the battery pack 210 and the motor 160. The swing arm pivot axis 133 extends through this space. As the motor 160 moves with the swing arm 132 relative to the frame 110, and thus the powerpack 200, flexible connections are needed to maintain fluid connection between portions of the cooling circuit 290 in the powerpack 200 and portions of the cooling circuit 290 in thermal communication with the motor 160. To reduce the movement of the hose 167 as the motor 160 moves with the swing arm 132 relative to the frame 110, part of the hose 167 is disposed at a radial distance from the swing arm pivot axis 133 that is less than twice a diameter of the hose 167. In other embodiments, this radial distance is less than 1.5 times the diameter of the hose 167. In other embodiments, this radial distance is less than the diameter of the hose 167.

Figure 9:
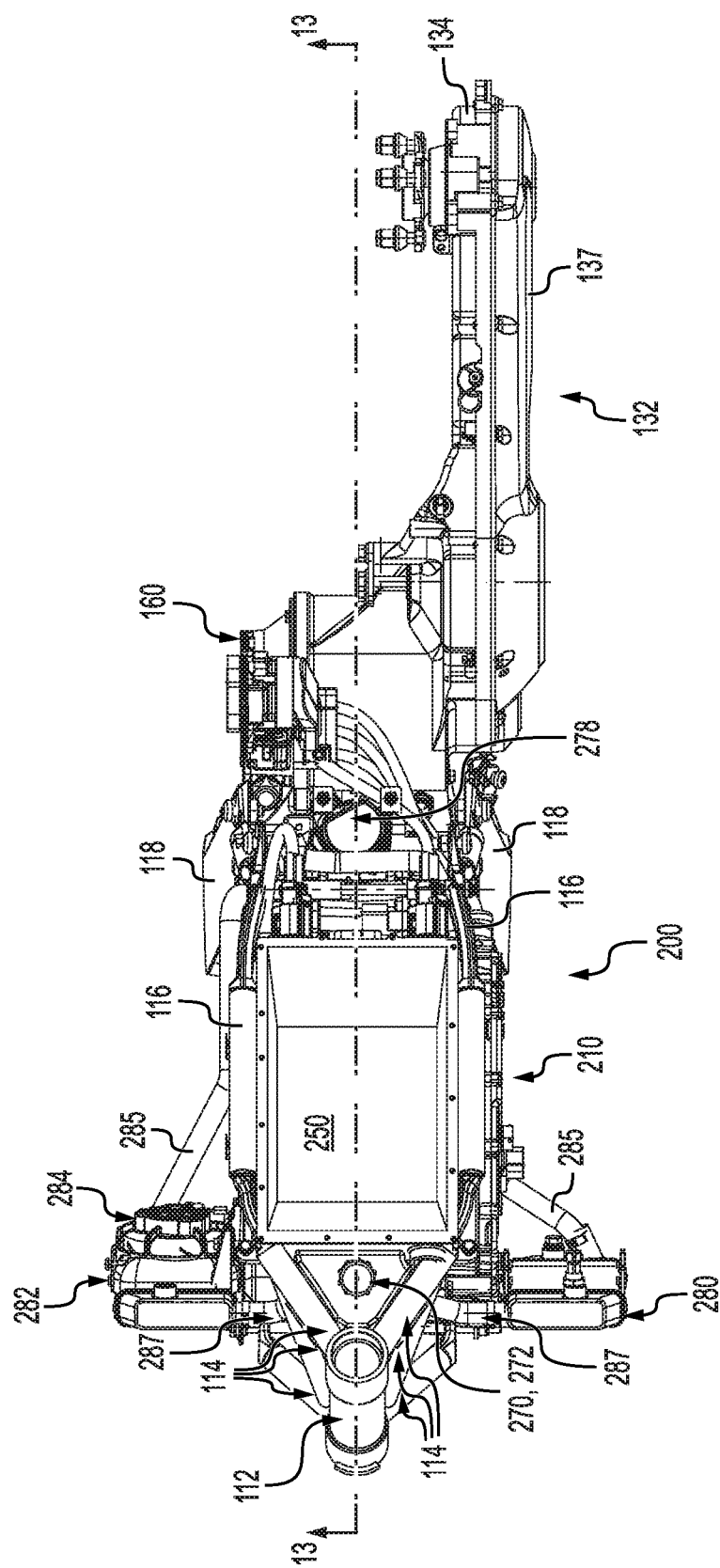
FIG. 9 is a top plan view of the components of FIG. 6 with the housing cover of the swing arm.
Figure 10:
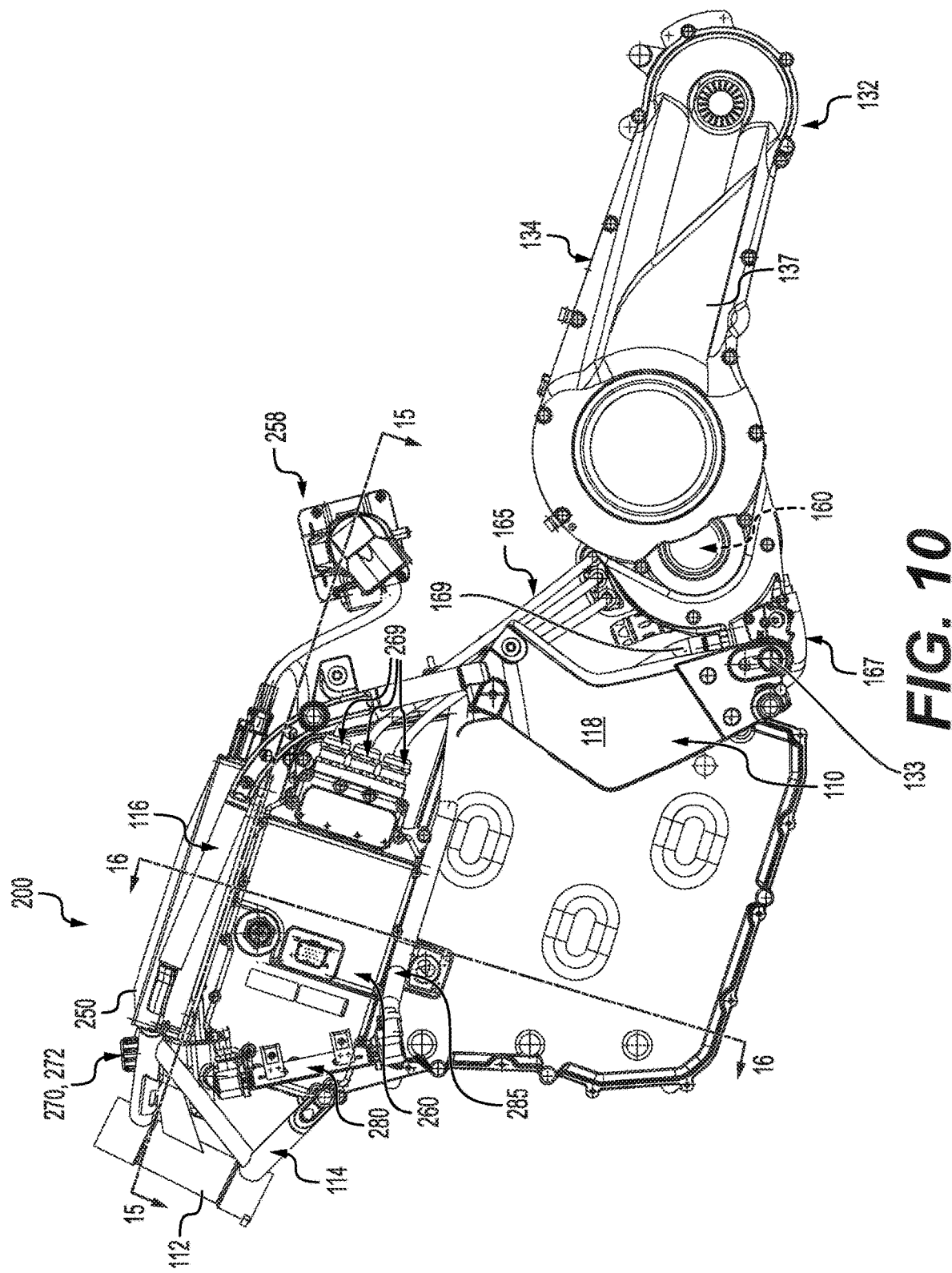
FIG. 10 is a left side elevation view of the components of FIG. 9.

With reference to FIGS. 9, 12, and 13, the vehicle 100 also includes a coolant pump 278 for circulating cooling through and forming a portion of the coolant circuit 290. In the illustrated embodiment, the coolant pump 278 is electrically connected to the battery pack 210 for powering the pump 278. The pump 278 is disposed partially rearward of the powerpack 200 in the present embodiment, although it is contemplated that placement of the pump 278 could vary. The pump 278 is fluidly connected to the motor cooling channel 168 by a flexible tube 169, also referred to as a hose 169. With reference to FIGS. 10, 12, 13 and 15, with the vehicle 100 at rest, a front end of the hose 169 is forward and vertically higher than the swing arm pivot axis 133 and a rear end of the hose 169 is rearward of the swing arm pivot axis 133 and in part vertically lower than the swing arm pivot axis 133. The hose 169 also extends in the space defined laterally between the frame members 118 and longitudinally between the battery pack 210 and the motor 160. As is noted above, the motor 160 pivots with the swing arm 132 relative to the frame 110 and further relative to the pump 278 which is also supported by the frame 110. The connection between the motor 160 and the pump 278 is thus also required to be flexible. To reduce the movement of the hose 169 as the motor 160 moves with the swing arm 132 relative to the frame 110, part of the hose 169 is disposed at a radial distance from the swing arm pivot axis 133 that is less than twice a diameter of the hose 169. In other embodiments, this radial distance is less than 1.5 times the diameter of the hose 169. In other embodiments, this radial distance is less than the diameter of the hose 169.

The vehicle 100 further includes two radiators for cooling the coolant fluid: a left radiator 280 disposed on a left side of the vehicle 100 and a right radiator 282 disposed on a right side of the vehicle 100. In the illustrated embodiment, the radiators 280, 282 are disposed partially forward of the powerpack 200, although exact placement could vary in different embodiments. Each radiator 280, 282 is fluidly connected to the cooling channels 254, 264, 226 of the powerpack 200 and forms a portion of the cooling circuit 290. Each radiator 280, 282 is arranged to receive airflow thereover during operation of the vehicle 100 to radiate heat away from the coolant via the radiators 280, 282.

The vehicle 100 includes two flexible tubes 285, with each tube 285 being connected between a corresponding one of the radiators 280, 282 and the pump 278. Each tube 285 extends along the corresponding right and left side of the powerpack 200. The left tube 285 is disposed generally vertically below the inverter 260, although exact placement of the tubes 285 could vary. The tubes 285, also referred to as hoses 285, further form a portion of the cooling circuit 290, as is illustrated schematically in FIG. 11. In at least some embodiments, the tubes 285 could be implemented as rigid tubing elements.

In the illustrated embodiment, the right radiator 282 includes a fan 284 connected to the housing of the radiator 282 to aid in increasing the cooling efficiency of the radiator 282. Depending on the embodiment, it is contemplated that the left radiator 280 could additionally or alternatively include a fan connected thereto. It is also contemplated that the fan 284 could be omitted in some cases.

With reference to at least FIG. 12, the vehicle 100 also includes flexible tubing components 287, also referred to as tubes 287 or hoses 287, fluidly connecting the radiators 280, 282 to the coolant reservoir 270 and forming a portion of the cooling circuit 290. As such, the tubes 287 fluidly connect each radiator 280, 282 to the battery cooling channel 226 via the coolant reservoir 270.

Returning to FIG. 11, flow of the cooling circuit 290 is schematically illustrated. Beginning at the coolant reservoir 270 (for simplicity of description), coolant flows from the reservoir 270 into the charger cooling channel 254. Coolant then flows into the inverter cooling channel 264 and then subsequently into the battery cooling channel 226. As is noted before, the coolant reservoir 270, the charger cooling channel 254, the inverter cooling channel 264, and the battery cooling channel 226 are rigidly fluidly connected together, without the use of tubes or hoses. From the battery cooling channel 226, coolant flows through the flexible tube 167 to the motor cooling channel 168. Coolant then flows from the channel 168 through the flexible tube 169 to the pump 278. Coolant is then subsequently returned by the pump 278 to forward portions of the vehicle 100 via tubes 285 on each of the right and left sides of the vehicle 100 to the radiators 280, 282. Having been at least partially cooled, coolant is then returned to the reservoir 270 via the hoses 287.

As is noted above, the direction of coolant flow could be reversed in at least some embodiments. The order of some components forming the coolant circuit 290 could be changed in some embodiments. As one non-limiting example, it is contemplated that coolant could flow through the radiators 280, 282 before the pump 278. While the order of the components along the cooling circuit 290 can vary, in the present embodiment the radiators 280, 282 are upstream from the cooling channels 254, 264, 226 of the powerpack 200. In this way, the powerpack components 250, 260, 210 which require more cooling may exchange more heat with the coolant in the cooling circuit 290 than subsequent components such as the motor 160 which are less sensitive to heating.

Figure 19:
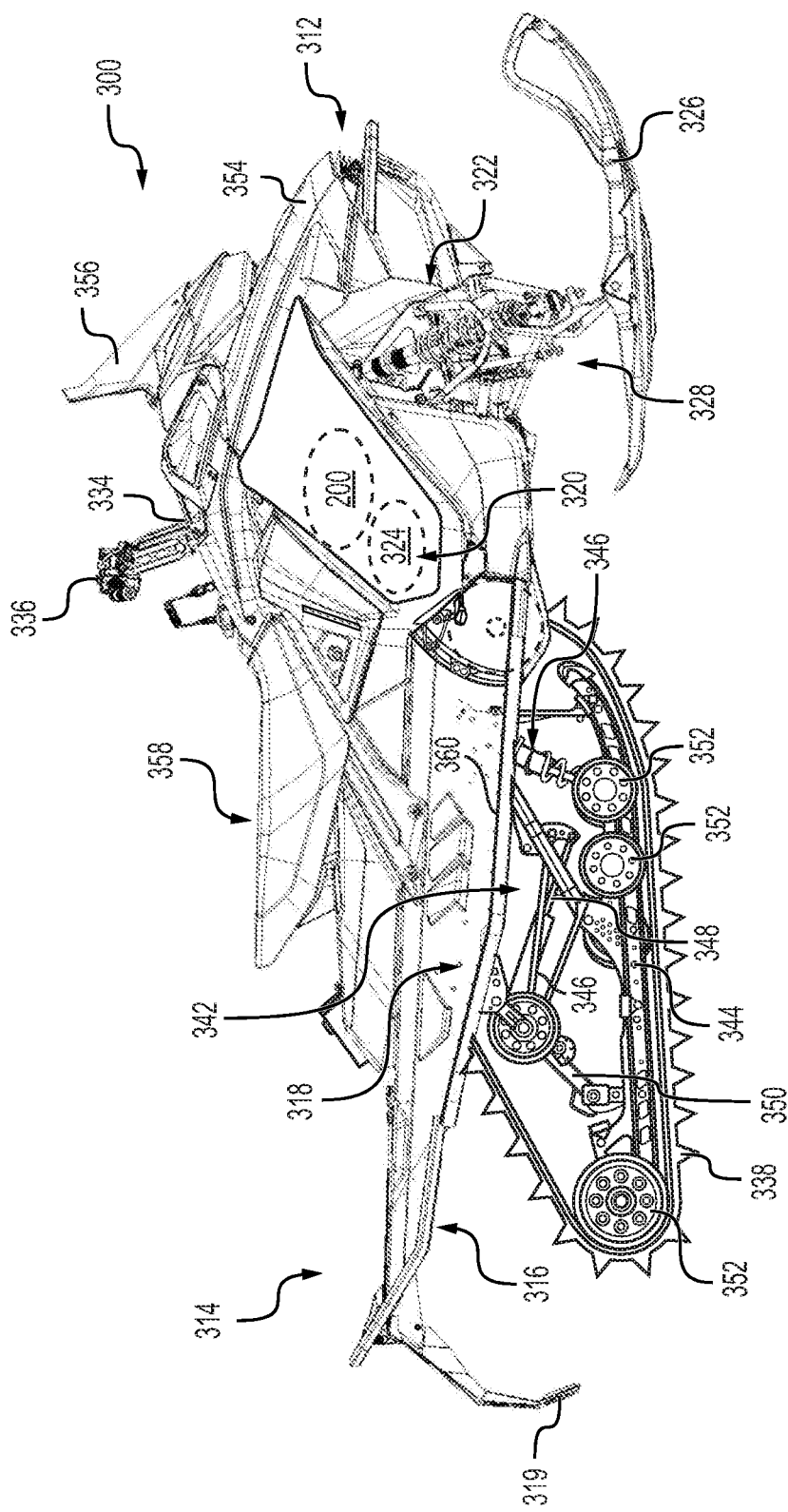
FIG. 19 is a right side elevation view of an electric snowmobile according to another non-limiting embodiment of the present technology.

With reference to FIG. 19, another non-limiting embodiment of a vehicle utilizes the powerpack 200 described above, specifically an electric snowmobile 300. The snowmobile 300 includes a forward end 312 and a rearward end 314 that are defined consistently with a forward travel direction of the snowmobile 300. The snowmobile 300 includes a frame 316 that includes a tunnel 318, a motor cradle portion 320 and a front suspension assembly portion 322.

The snowmobile 300 includes the powerpack 200 (shown schematically) and an electric motor 324 (shown schematically), carried by the motor cradle portion 320 of the frame 316. Two skis 326 (a right ski 326 being illustrated) are positioned at the forward end 312 of the snowmobile 300 and are attached to the front suspension assembly portion 322 of the frame 316 through front suspension assemblies 328. A steering device in the form of handlebar 336 is attached to the upper end of the steering column 334 to allow a driver to rotate the skis 326, in order to steer the snowmobile 300.

An endless drive track 338 is disposed generally under the tunnel 318 and is operatively connected to the motor 324. The endless drive track 338 is driven to run about a rear suspension assembly 342 for propulsion of the snowmobile 300. The rear suspension assembly 342 includes a pair of slide rails 344 in sliding contact with the endless drive track 338. The rear suspension assembly 342 also includes a plurality of shock absorbers 346. Suspension arms 348 and 350 are provided to attach the slide rails 344 to the frame 316. A plurality of idler wheels 352 are also provided in the rear suspension assembly 342. Other types and geometries of rear suspension assemblies are also contemplated.

At the forward end 312 of the snowmobile 300, fairings 354 enclose the powerpack 200. The fairings 354 include a hood and one or more side panels that can be opened to allow access to the powerpack 200 and/or the motor 324 when this is required, for example, for inspection or maintenance of the powerpack 200 and/or the motor 324. A windshield 356 is connected to the fairings 354 near the forward end 312 of the snowmobile 300. Alternatively, the windshield 356 could be connected directly to the handlebar 336. The windshield 356 acts as a wind screen to lessen the force of the air on the driver while the snowmobile 300 is moving forward.

A straddle seat 358 is positioned over the tunnel 318. Two footrests 360 are positioned on opposite sides of the snowmobile 300 below the seat 358 to accommodate the driver's feet. A snow flap 319 is disposed at the rear end 314 of the snowmobile 300. The tunnel 318 consists of one or more pieces of sheet metal arranged to form an inverted U-shape that is connected at the front to the motor cradle portion 320 and extends rearward therefrom.

The snowmobile 300 has other features and components which would be readily recognized by one of ordinary skill in the art, further explanation and description of these components will not be provided herein.

The vehicles 100, 300 implemented in accordance with some non-limiting implementations of the present technology can be represented as follows, presented in numbered clauses.

CLAUSE 1: An electric vehicle (100, 300) comprising:
a frame (110);
at least one ground-engaging member (121, 127) operatively connected to the frame (110);
an electric motor (160) operatively connected to the at least one ground-engaging member (121, 127);
an electric powerpack (200) supported by the frame (110), the powerpack (200) including:
a battery pack (210) including:
a battery housing (220) defining a battery cooling channel (226); and
a plurality of battery cells (230) housed in the battery housing (220);
a charger (250) electrically connected to the plurality of battery cells (230), the charger (250) including:
a charger housing (252) defining a charger cooling channel (254);
an inverter (260) electrically connected to the plurality of battery cells (230), the inverter (260) including:
an inverter housing (262) defining an inverter cooling channel (264),
the battery cooling channel (226), the charger cooling channel (254), and the inverter cooling channel (264) being fluidly connected together by rigid fluid connections;
at least one radiator (280, 282) fluidly connected to the battery cooling channel (226);
a cooling circuit (290) being formed at least in part by the battery cooling channel (226), the charger cooling channel (254), the inverter cooling channel (264), and the at least one radiator (280, 282); and a pump (278) fluidly connected to the cooling circuit (290) for pumping liquid coolant through the cooling circuit (290).

CLAUSE 2. The vehicle (100, 300) of clause 1, further comprising a motor cooling channel (168) for cooling the electric motor (160) fluidly connected to the battery cooling channel (226) and forming a portion of the cooling circuit (290).

CLAUSE 3. The vehicle (100, 300) of clause 2, further comprising:
a swing arm (132) pivotally connected to the frame (110), the swing arm (132) including a swing arm housing (134); and
wherein:
the electric motor (160) includes a motor housing (162);
the motor housing (162) includes a channeled outer surface (164) in thermal contact with at least some internal components of the electric motor (160);
the swing arm housing (134) defines a motor cavity (135);
the electric motor (160) being disposed in the motor cavity (135); and
the motor cooling channel (168) is formed between the channeled outer surface (164) of the motor housing (162) and an internal surface of the motor cavity (135).

CLAUSE 4. The vehicle (100, 300) of clause 3, further comprising at least one flexible tube (167, 169) fluidly connecting the motor cooling channel (168) to the pump (278).

CLAUSE 5. The vehicle (100, 300) of clause 3, wherein a channel formed by the channeled outer surface (164) forms a spiral winding around an exterior of the electric motor (160).

CLAUSE 6. The vehicle (100, 300) of any one of clauses 1 to 5, wherein:
the inverter housing (262) is fastened to the battery housing (220); and
at least one of an inlet and an outlet of the inverter cooling channel (264) is connected to at least one of an inlet and an outlet of the battery cooling channel (226).

CLAUSE 7. The vehicle (100, 300) of clause 6, wherein:
the battery pack (210) includes a first electric connector (215) electrically connected to the plurality of battery cells (230) and disposed on an exterior of the battery housing (220);
the inverter (260) includes a second electric connector (261) disposed on an exterior of the invertor housing (162);
the first electric connector (215) and the second electric connector (261) are selectively connected together; and
when the vehicle (100, 300) is in operation, the inverter (260) receives electric power from the plurality of battery cells (230) via the first electric connector (215) and the second electric connector (261).

CLAUSE 8. The vehicle (100, 300) of clause 7, wherein the second electric connector (261) and the at least one of the inlet and the outlet of the inverter cooling channel (264) are disposed on a same side of the inverter (260).

CLAUSE 9. The vehicle (100, 300) of any one of clauses 1 to 8, wherein the charger (250) and the inverter (260) are mounted to the battery housing (220).

CLAUSE 10. The vehicle (100, 300) of clause 9, further comprising a coolant reservoir (270) connected to the powerpack (200).

CLAUSE 11. The vehicle (100, 300) of any one of clauses 1 to 10, wherein at least one of the rigid fluid connections connecting the battery cooling channel (226), the charger cooling channel (254), and the inverter cooling channel (264) together is formed by one of the charger housing (252), the battery housing (220), and the inverter housing (262).

CLAUSE 12. The vehicle (100, 300) of any one of clauses 1 to 11, wherein connections between the battery cooling channel (226), the charger cooling channel (254), and the inverter cooling channel (264) are internal to the electric powerpack (200).

CLAUSE 13. The vehicle (100, 300) of any one of clauses 1 to 12, wherein:
the charger cooling channel (254) extends along a side of the charger (250) facing an interior of the powerpack (200); and
the inverter cooling channel (264) extends along a side of the inverter (260) facing the interior of the powerpack (200).

CLAUSE 14. The vehicle (100, 300) of clause 13, wherein the battery cooling channel (226) extends through a center portion of the battery pack (210) in the interior of the powerpack (200).

CLAUSE 15. The vehicle (100, 300) of any one of clauses 1 to 14, wherein the at least one radiator (280, 282) includes:
a left radiator (280) disposed on a left side of the vehicle (100, 300); and
a right radiator (282) disposed on a right side of the vehicle (100, 300).

CLAUSE 16. The vehicle (100, 300) of clause 15, further comprising a plurality of flexible tubing components (287) fluidly connecting the left radiator (280) and the right radiator (282) to the at least one battery cooling channel (226) and forming a portion of the cooling circuit (290).

CLAUSE 17. The vehicle (100, 300) of clause 15, wherein at least one of the left radiator (280) and the right radiator (282) includes a fan (284) connected to a radiator housing thereof.

CLAUSE 18. The vehicle (100, 300) of any one of clauses 1 to 17, further comprising a coolant reservoir (270) fluidly connected to the cooling circuit (290).

CLAUSE 19. The vehicle (100, 300) of clause 18, wherein the charger housing (252) includes at least one of an inlet and an outlet configured to be sealingly fit into at least one of an outlet and an inlet of the coolant reservoir (270).

CLAUSE 20. The vehicle (100, 300) of clause 18, wherein:
the coolant reservoir (270) is disposed at least partially forward of the electric powerpack (200); and
the pump (278) is disposed at least partially rearward of the electric powerpack (200).

CLAUSE 21. The vehicle (100, 300) of any one of clauses 1 to 20, further comprising:
a motor cooling channel (168) for cooling the electric motor (160) fluidly connected to the battery cooling channel (226), and
a coolant reservoir (270) connected to the powerpack (200); and
wherein:
the at least one radiator (280, 282) includes a pair of radiators (280, 282), and
the cooling circuit (290) is further formed by at least the pair of radiators (280, 282), the motor cooling channel (168), and the coolant reservoir (270).

CLAUSE 22. The vehicle (100) of any one of clauses 1 to 21, further comprising:
a straddle seat (140); and
wherein:
the at least one ground-engaging member (121,127) includes:
at least one front ground-engaging member (121) disposed at least in part forward of the electric powerpack (200), and
at least one rear ground-engaging member (127) disposed at least in part rearward of the electric powerpack (200).

CLAUSE 23. The vehicle (100) of any one of clauses 1 to 22, wherein:
the at least one ground-engaging member (121,127) includes:
a front wheel (121) disposed at least in part forward of the electric powerpack (200), and
a rear wheel (127) disposed at least in part rearward of the electric powerpack (200); and
the vehicle (100) is an electric motorcycle (100).

CLAUSE 24. The vehicle (300) of any one of clauses 1 to 22, wherein:
the vehicle (300) is an electric snowmobile (300); and
the at least one ground-engaging member includes two skis (326).

CLAUSE 25. An electric vehicle (100) comprising:
a frame (110), the frame (110) having a pair of frame members (118);
a front ground-engaging member (121) operatively connected to the frame (110);
a swing arm (132) pivotally connected to the pair of frame members (118) about a swing arm pivot axis (133), the swing arm pivot axis (133) extending through the pair of frame members (118);
a rear ground-engaging member (127) operatively connected to the swing arm (132);
an electric motor (160) mounted to the swing arm (132) and operatively connected to the rear ground-engaging member (127);
a motor cooling channel (168) in thermal communication with the electric motor (160) for cooling the electric motor (160);
a battery pack (210) supported by the frame (110);
a battery cooling channel (226) in thermal communication with the battery pack (210) for cooling the battery pack (210); and
at least one hose fluidly (167, 169) connected between the battery cooling channel (226) and the motor cooling channel (168), the at least one hose (167, 169) extending in a space defined laterally between the frame members (118) and longitudinally between the battery pack (210) and the motor (160).

CLAUSE 26. The vehicle (100) of clause 25, wherein the swing arm pivot axis (133) extends through the space defined laterally between the frame members (118) and longitudinally between the battery pack (210) and the motor (160).

CLAUSE 27. The vehicle (100) of clause 25 or 26, wherein, with the vehicle (100) at rest:
a front end of the at least one hose (167, 169) is forward of the swing arm pivot axis (133);
the front end of the at least one hose (167, 169) is vertically higher than the swing arm pivot axis (133);
a rear end of the at least one hose (167, 169) is rearward of the swing arm pivot axis (133); and
the rear end of the at least one hose (167, 169) is at least in part vertically lower than the swing arm pivot axis (133).

CLAUSE 28. The vehicle (100) of any one of clauses 25 to 27, wherein part of the at least one hose (167, 169) is disposed at a radial distance from the swing arm pivot axis (133) that is less than twice a diameter of the at least one hose (167, 169).

CLAUSE 29. The vehicle (100) of clause 28, wherein the radial distance is less than 1.5 times the diameter of the at least one hose (167, 169).

CLAUSE 30. The vehicle (100) of clause 29, wherein the radial distance is less than the diameter of the at least one hose (167, 169).

CLAUSE 31. The vehicle (100) of any one of clauses 25 to 30, wherein:
the at least one hose (167, 169) includes a first hose (169) and a second hose (167);
one of the first and second hoses (167, 169) supplying liquid coolant from the battery cooling channel (226) to the motor cooling channel (168); and
another one of the first and second hoses (167, 169) supplying liquid coolant from the motor cooling channel (168) to the battery cooling channel (226).

CLAUSE 32. The vehicle (100) of clause 31, further comprising a pump (278); and
wherein the pump (278) is fluidly connected between the first hose (169) and the battery cooling channel (226).

CLAUSE 33. The vehicle (100) of any one of clauses 25 to 32, wherein the battery pack (210) includes:
a battery housing (220) defining the battery cooling channel (226); and
a plurality of battery cells (230) housed in the battery housing (220).

CLAUSE 34. The vehicle (100) of any one of clauses 25 to 33, wherein the battery pack (210) is completely forward of the swing arm pivot axis (133).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. An electric vehicle comprising:
a frame;
at least one ground-engaging member operatively connected to the frame;
an electric motor operatively connected to the at least one ground-engaging member;
an electric powerpack supported by the frame, the powerpack including:
a battery pack including:
a battery housing defining a battery cooling channel; and
a plurality of battery cells housed in the battery housing;
a charger electrically connected to the plurality of battery cells, the charger including:
a charger housing defining a charger cooling channel;
an inverter electrically connected to the plurality of battery cells, the inverter including:
an inverter housing defining an inverter cooling channel,
the battery cooling channel, the charger cooling channel, and the inverter cooling channel being fluidly connected together by rigid fluid connections;
at least one radiator fluidly connected to the battery cooling channel;
a cooling circuit being formed at least in part by the battery cooling channel, the charger cooling channel, the inverter cooling channel, and the at least one radiator; and
a pump fluidly connected to the cooling circuit for pumping liquid coolant through the cooling circuit.

2. The vehicle of claim 1, further comprising a motor cooling channel for cooling the electric motor fluidly connected to the battery cooling channel and forming a portion of the cooling circuit.

3. The vehicle of claim 2, further comprising:
a swing arm pivotally connected to the frame, the swing arm including a swing arm housing; and
wherein:
the electric motor includes a motor housing;
the motor housing includes a channeled outer surface in thermal contact with at least some internal components of the electric motor;
the swing arm housing defines a motor cavity;
the electric motor being disposed in the motor cavity; and
the motor cooling channel is formed between the channeled outer surface of the motor housing and an internal surface of the motor cavity.

4. The vehicle of claim 3, further comprising at least one flexible tube fluidly connecting the motor cooling channel to the pump.

5. The vehicle of claim 3, wherein a channel formed by the channeled outer surface forms a spiral winding around an exterior of the electric motor.

6. The vehicle of claim 1, wherein:
the inverter housing is fastened to the battery housing; and
at least one of an inlet and an outlet of the inverter cooling channel is connected to at least one of an inlet and an outlet of the battery cooling channel.

7. The vehicle of claim 6, wherein:
the battery pack includes a first electric connector electrically connected to the plurality of battery cells and disposed on an exterior of the battery housing;
the inverter includes a second electric connector disposed on an exterior of the inverter housing;
the first electric connector and the second electric connector are selectively connected together; and
when the vehicle is in operation, the inverter receives electric power from the plurality of battery cells via the first electric connector and the second electric connector.

8. The vehicle of claim 1, wherein the charger and the inverter are mounted to the battery housing.

9. The vehicle of claim 1, wherein at least one of the rigid fluid connections connecting the battery cooling channel, the charger cooling channel, and the inverter cooling channel together is formed by one of the charger housing, the battery housing, and the inverter housing.

10. The vehicle of claim 1, wherein connections between the battery cooling channel, the charger cooling channel, and the inverter cooling channel are internal to the electric powerpack.

11. The vehicle of claim 1, wherein:
the charger cooling channel extends along a side of the charger facing an interior of the powerpack; and
the inverter cooling channel extends along a side of the inverter facing the interior of the powerpack.

12. The vehicle of claim 11, wherein the battery cooling channel extends through a center portion of the battery pack in the interior of the powerpack.

13. The vehicle of claim 1, wherein the at least one radiator includes:
   a left radiator disposed on a left side of the vehicle; and
   a right radiator disposed on a right side of the vehicle.

14. The vehicle of claim 13, further comprising a plurality of flexible tubing components fluidly connecting the left radiator and the right radiator to the battery cooling channel and forming a portion of the cooling circuit.

15. The vehicle of claim 1, further comprising a coolant reservoir fluidly connected to the cooling circuit.

16. The vehicle of claim 15, wherein the charger housing includes at least one of an inlet and an outlet configured to be sealingly fit into at least one of an outlet and an inlet of the coolant reservoir.

17. The vehicle of claim 1, further comprising:
   a motor cooling channel for cooling the electric motor fluidly connected to the battery cooling channel, and
   a coolant reservoir connected to the powerpack; and
   wherein:
      the at least one radiator includes a pair of radiators, and
      the cooling circuit is further formed by at least the pair of radiators, the motor cooling channel, and the coolant reservoir.

18. The vehicle of claim 1, further comprising:
   a straddle seat; and
   wherein:
      the at least one ground-engaging member includes:
         at least one front ground-engaging member disposed at least in part forward of the electric powerpack, and
         at least one rear ground-engaging member disposed at least in part rearward of the electric powerpack.

19. The vehicle of claim 1, wherein:
   the at least one ground-engaging member includes:
      a front wheel disposed at least in part forward of the electric powerpack, and
      a rear wheel disposed at least in part rearward of the electric powerpack; and
   the vehicle is an electric motorcycle.

20. The vehicle of claim 1, wherein:
   the vehicle is an electric snowmobile; and
   the at least one ground-engaging member includes two skis.

* * * * *